United States Patent
Tazuke et al.

(10) Patent No.: US 12,493,282 B2
(45) Date of Patent: Dec. 9, 2025

(54) INFORMATION PROCESSING APPARATUS, FLOW GENERATION METHOD, AND COMPUTER PROGRAM PRODUCT

(71) Applicants: Tomoyuki Tazuke, Tokyo (JP); Ryuichi Takano, Tokyo (JP); Tsuyoshi Yamada, Kanagawa (JP)

(72) Inventors: Tomoyuki Tazuke, Tokyo (JP); Ryuichi Takano, Tokyo (JP); Tsuyoshi Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 406 days.

(21) Appl. No.: 17/876,093

(22) Filed: Jul. 28, 2022

(65) Prior Publication Data

US 2023/0058327 A1 Feb. 23, 2023

(30) Foreign Application Priority Data

Aug. 23, 2021 (JP) .................. 2021-135838

(51) Int. Cl.
*G05B 19/4155* (2006.01)

(52) U.S. Cl.
CPC ............ *G05B 19/4155* (2013.01); *G05B 2219/50391* (2013.01)

(58) Field of Classification Search
None
See application file for complete search history.

(56) References Cited

U.S. PATENT DOCUMENTS

2014/0336944 A1 11/2014 Yoshizawa et al.
2015/0082215 A1* 3/2015 Sakai .................. G06F 3/04842
715/765

(Continued)

FOREIGN PATENT DOCUMENTS

CN 111966055 A * 11/2020 ....... G05B 19/41865
JP 2014-238812 12/2014

(Continued)

OTHER PUBLICATIONS

"The Data Journalism Handbook," Web page <https://datajournalism.com/read/handbook/one>, Mar. 2012, pp. 108-112.

(Continued)

*Primary Examiner* — David Earl Ogg
(74) *Attorney, Agent, or Firm* — Harness, Dickey & Pierce, P.L.C.

(57) ABSTRACT

An information processing apparatus includes circuitry. The circuitry displays one or more screens that receive an operation by a user. The circuitry identifies an operation item corresponding to the operation based on display information of the one or more screens, according to the operation by on the one or more screens. The circuitry generates an operation component associated with a condition corresponding to the operation item. The circuitry generates a flow of operations based on the operation component according to an order of operations by the user. The circuitry compares multiple flows with one another, to extract a difference between multiple operation components included in one of the multiple flows and multiple operation components included in another one of the multiple flows. The circuitry adds an operation component of a conditional branch before one of the multiple operation components for which the difference is extracted.

18 Claims, 29 Drawing Sheets

(56) References Cited

U.S. PATENT DOCUMENTS

| | | | |
|---|---|---|---|
| 2017/0109194 A1* | 4/2017 | Namihira | G06F 9/45512 |
| 2019/0079785 A1* | 3/2019 | Hori | G06F 8/34 |
| 2019/0079797 A1* | 3/2019 | Hori | G06Q 10/0633 |
| 2020/0371837 A1* | 11/2020 | Hori | G06F 3/04817 |

FOREIGN PATENT DOCUMENTS

| | | | |
|---|---|---|---|
| JP | 2015-148982 | | 8/2015 |
| JP | 2018185637 A | * | 11/2018 |
| JP | 2019-169044 | | 10/2019 |
| JP | 20210064355 A | | 4/2021 |

OTHER PUBLICATIONS

Office Action dated Mar. 18, 2025 issued in corresponding Japanese Patent Application No. 2021-135838.

* cited by examiner

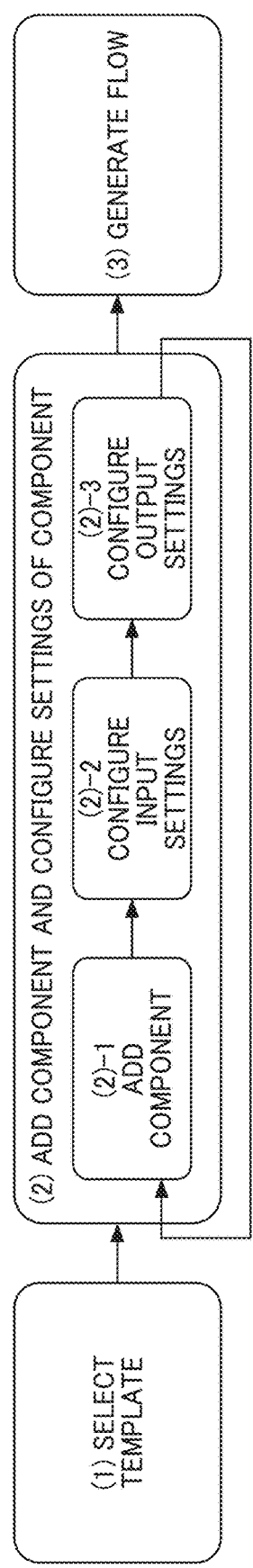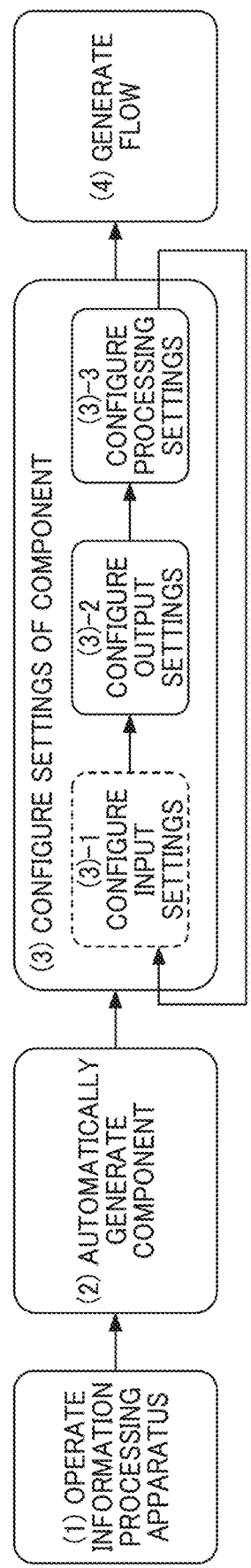

<SCREEN TRANSITION>

<OPERATION FLOW WITH RESPECT TO SCREEN>

<OPERATION FLOW WHEN USING RECORDING FUNCTION>

⟨OPERATION FLOW WHEN USING RECORDING FUNCTION⟩

⟨GENERATION OF COMPONENT FROM OPERATION (AUTOMATIC GENERATION BY PROGRAM)⟩

FIG. 8A
CASE OF STARTING WORK

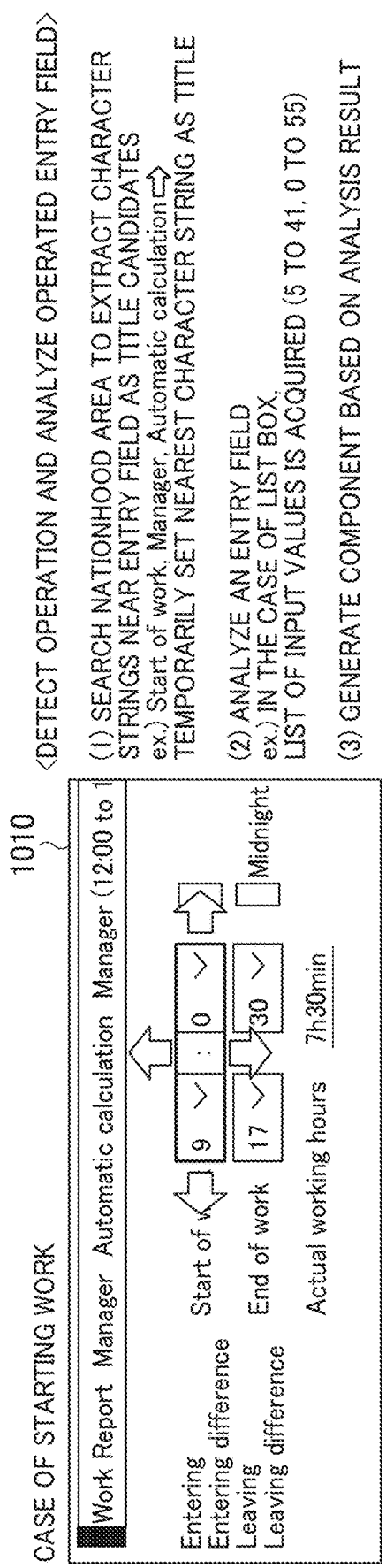

⟨DETECT OPERATION AND ANALYZE OPERATED ENTRY FIELD⟩

(1) SEARCH NATIONHOOD AREA TO EXTRACT CHARACTER STRINGS NEAR ENTRY FIELD AS TITLE CANDIDATES
ex.) Start of work, Manager, Automatic calculation ⇔ TEMPORARILY SET NEAREST CHARACTER STRING AS TITLE (2) ANALYZE AN ENTRY FIELD
ex.) IN THE CASE OF LIST BOX, LIST OF INPUT VALUES IS ACQUIRED (5 TO 41, 0 TO 55)

(3) GENERATE COMPONENT BASED ON ANALYSIS RESULT

FIG. 8B
CASE OF REASON FOR OVERTIME/REMARKS

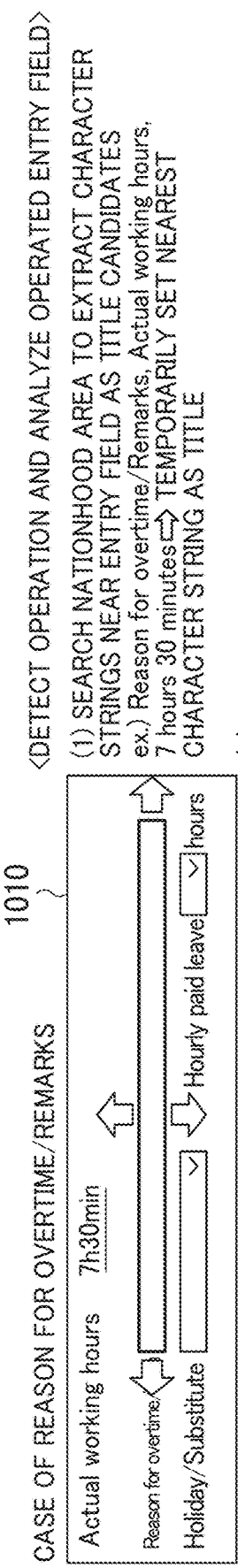

⟨DETECT OPERATION AND ANALYZE OPERATED ENTRY FIELD⟩

(1) SEARCH NATIONHOOD AREA TO EXTRACT CHARACTER STRINGS NEAR ENTRY FIELD AS TITLE CANDIDATES
ex.) Reason for overtime/Remarks, Actual working hours, 7 hours 30 minutes ⇔ TEMPORARILY SET NEAREST CHARACTER STRING AS TITLE (2) ANALYZE AN ENTRY FIELD
ex.) IN THE CASE OF TEXT BOX, ACQUIRE VALIDATION OF ENTRY FIELD (3) GENERATE COMPONENT BASED ON ANALYSIS RESULT FIG. 9A ⟨SCREEN TRANSITION⟩
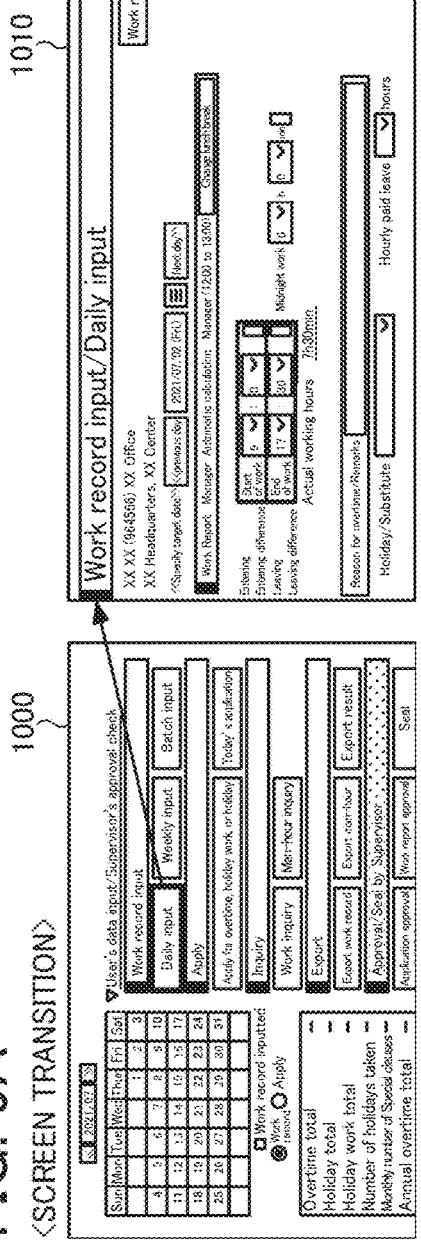
FIG. 9B ⟨OPERATION FLOW WITH RESPECT TO SCREEN⟩
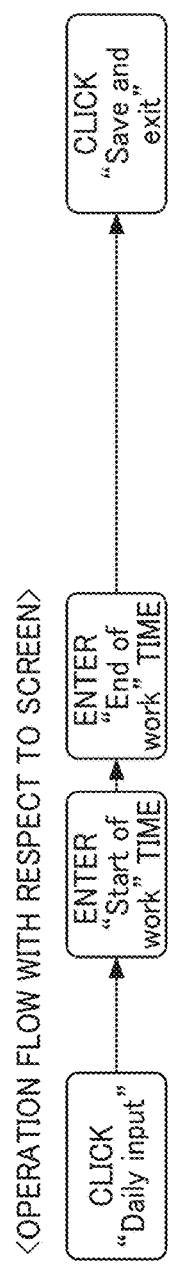
FIG. 9C ⟨OPERATION FLOW WHEN USING RECORDING FUNCTION⟩
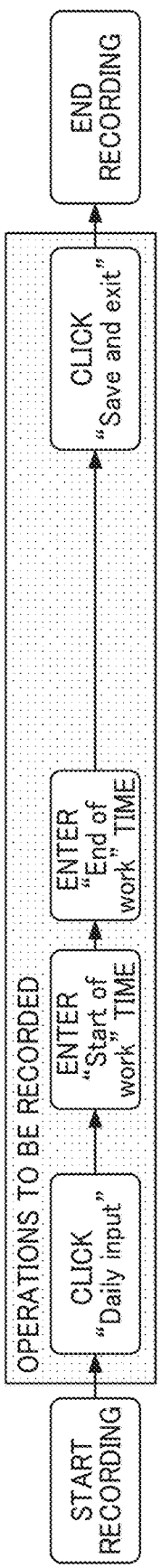

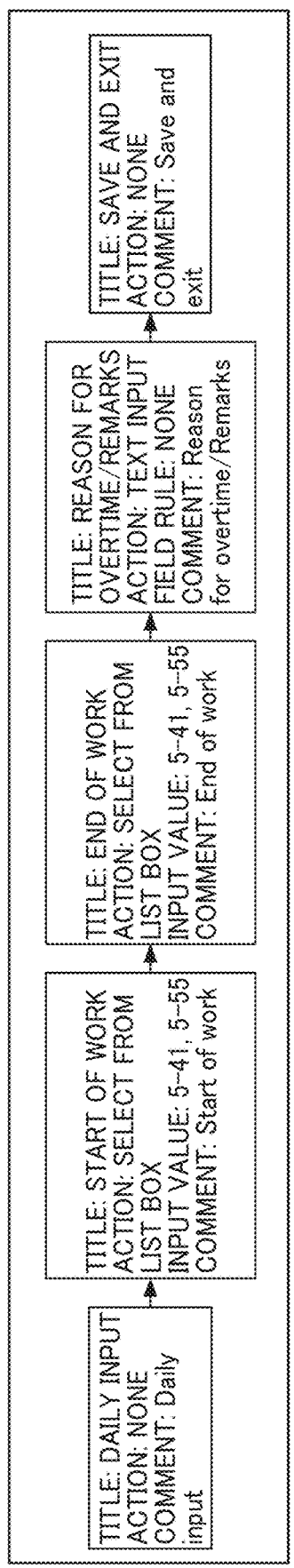
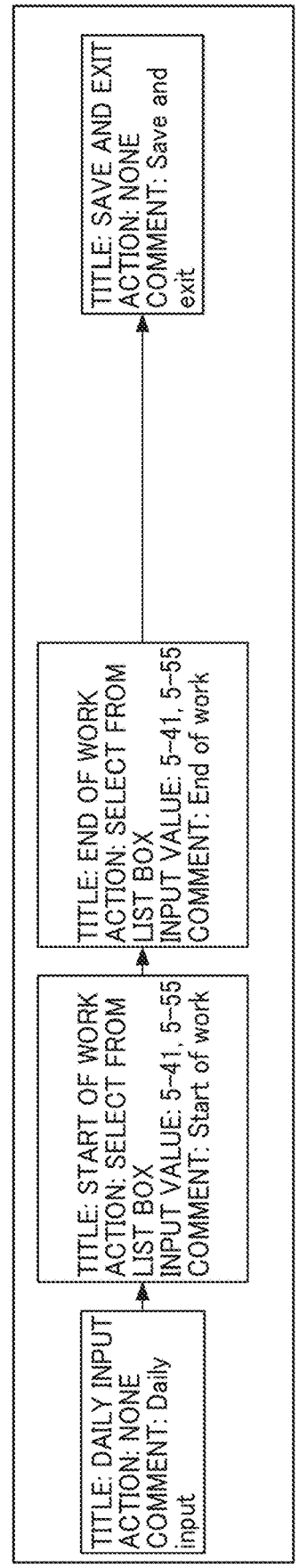
FIG. 10A
FIG. 10B

1. Please let us know your understanding of today's study session.*
   ○ Understood
   ○ Almost understood
   ○ Half understood
   ○ Not well understood
   ○ Impossible to understood

| Delivery address classification | ⊙ Home  ○ Company  ○ Other |

FIG. 16A 1060

| Email Address | Required | ⟨Single-byte alphanumeric characters⟩ An email address already registered by other members cannot be registered. [          ] Please enter again for confirmation (do not copy or paste). [          ] |

FIG. 16B 1070

| Last name (roman letters) | First name (roman letters) |
|---|---|
| XXXXXX | XXXXXXX |

FIG. 16C 1080

| Age |
|---|
| 45 years old |

FIG. 17A

```
                                                              1090
┌─────────────────────────────────────────────────────┐
│ (¥) Budget    ● Per person    No lower limit  ~     │
│               ○ Total                               │
│                 (per room per night)                │
│                              ¥5,000                 │
│ ☆ Detailed   Room type   Single ¥6,000    □ S      │
│   options               4 bed  ¥7,000     □ J      │
│                                ¥8,000               │
│              Room features     ¥9,000               │
│                        □ Open                       │
│                                ¥10,000    □ S      │
│              Non-smoking /  □ No sm                 │
│              smoking in room   ¥12,000              │
│                                ¥14,000              │
│              Meal              ¥16,000    □ B      │
│                        □ No m ¥18,000               │
│              Provider company  ¥20,000              │
│                        XXX    ¥30,000     □ X      │
│                                ¥40,000              │
│                                ¥50,000              │
│                                ¥100,000             │
└─────────────────────────────────────────────────────┘
```

| Contact information (phone number) | Priority 1 | Home ∨ | 00000000 | * |
| | Priority 2 | | | |
| | * Please e | Cell phone | information that we contact during the day. | |
| | | Office phone | | |
| (Notes) | | Other | | |

FIG. 18

About card service and payment

| | | |
|---|---|---|
| Your desired card brand | XXX Card (1) ▼ | |
| PIN | Four single-byte numbers<br>▦▦▦▦▦<br>Please enter again for confirmation.<br>▦▦▦▦▦ | * (1) Home phone number, (2) date of birth (both Western and Japanese calendars), and their combinations, and (3) the same 4-digit number from "0000" to "9999" cannot be used as a PIN.<br>* The PIN is required for personal authentication, and transactions involving the entry of the PIN are not covered by the membership security system, so please manage the PIN carefully. |
| Purpose of conducting transaction | ☑ Cost-of-living settlement  ☑ Business expense settlement | ■About the purpose of conducting transaction |
| Payment date | ○ 10th   ● 26th | ■About payment date |
| Family card | ○ Agree to [Input Procedure] and apply<br>● Do not apply | ■ Simultaneous application for family card<br>■ Important matters and membership agreement, Special contract<br><br>[Input procedure]<br>[Input Procedure]<br>When applying for a family card, the prospective family card member must confirm and register the following.<br><br>1. Click "important matters and membership agreement, Special contracts" at the top right of this column, and check the displayed rules and special contracts displayed.<br><br>2. If you agree and apply for a family card, please put a check mark in "I agree to the 'input procedure' and apply" at the top left of this column. (If you do not agree, you cannot apply for a family card.)<br><br>If you are planning to become a primary member, please guide the prospective family card member to accept the application for a family card by the prospective family card member, and then to enter this field. |

< Back

[Next]

Temporarily save >

About card service and payment (1200)

| Field | Input | Notes |
|---|---|---|
| Your desired card brand | XXX Card (1) ▼ | |
| PIN | Four single-byte numbers: [••••]<br>Please enter again for confirmation: [••••] | * (1) Home phone number, (2) date of birth (both Western and Japanese calendars), and their combinations, and (3) the same 4-digit number from "0000" to "9999" cannot be used as a PIN.<br>* The PIN is required for personal authentication, and transactions involving the entry of the PIN are not covered by the membership security system, so please manage the PIN carefully. |
| Purpose of conducting transaction | ☑ Cost-of-living settlement ☑ Business expense settlement | ■ About the purpose of conducting transaction |
| Payment date | ○ 10th  ● 26th | ■ About payment date |
| Family card | ● Agree to [Input Procedure] and apply<br>○ Do not apply | ■ Simultaneous application for family card<br>■ Important matters and membership agreement, Special contract<br>Input procedure<br>[Input Procedure]<br>When applying for a family card, the prospective family card member must confirm and register the following:<br>1. Click "Important matters and membership agreement, Special contracts" at the top right of this column, and check the displayed rules and special contracts displayed.<br>2. If you agree and apply for a family card, please put a check mark in "I agree to the 'input procedure' and apply" at the top left of this column. (If you do not agree, you cannot apply for a family card.)<br>If you are planning to become a primary member, please guide the prospective family card member to accept the application for a family card by the prospective family card member, and then to enter this field. |
| Name | Last name: (kanji character) [ ]  First name: (kanji character) [ ]<br>Last name: (katakana character) [ ]  First name: (katakana character) [ ] | |
| Date of birth | - Please select ▼  — ▼ Month  — ▼ Date | |
| Gender | ○ Male  ○ Female | |
| Relationship | - Please select ▼ | |
| PIN | Four single-byte numbers: [ ]<br>Please enter again for confirmation: [ ] | * (1) Home phone number, (2) date of birth (both Western and Japanese calendars), and their combinations, and (3) the same 4-digit number from "0000" to "9999" cannot be used as a PIN.<br>* The PIN is required for personal authentication, and transactions involving the entry of the PIN are not covered by the membership security system, so please manage the PIN carefully. |

< Back        [ Temporarily save > ]

FIG. 23

<GENERATION OF COMPONENT FROM OPERATION
(IN CASE OF APPLICATION FOR FAMILY CARD)>

TITLE: CARD BRAND  COMMENT: CARD BRAND
ACTION: SELECT FROM LIST  INPUT VALUE: XXX/YYY

↓

TITLE: PIN  COMMENT: PIN
ACTION: TEXT  INPUT VALUE: FOUR DIGITS

↓

TITLE: FOR CONFIRMATION  COMMENT: PLEASE ENTER AGAIN FOR CONFIRMATION.
ACTION: TEXT  INPUT VALUE: FOUR DIGITS

↓

TITLE: PURPOSE OF CONDUCTING TRANSACTION
COMMENT: PURPOSE OF CONDUCTING TRANSACTION  ACTION: SELECT
INPUT VALUE: COST-OF-LIVING SETTLEMENT/BUSINESS EXPENSE SETTLEMENT

↓

TITLE: PAYMENT DATE  COMMENT: PAYMENT DATE
ACTION: SELECT  INPUT VALUE: 10th / 26th

↓

TITLE: FAMILY CARD  COMMENT: FAMILY CARD
ACTION: SELECT  INPUT VALUE: AGREE AND APPLY / DO NOT APPLY

↓

TITLE: LAST NAME (KANJI CHARACTER)  COMMENT: LAST NAME (KANJI CHARACTER)
ACTION: TEXT  INPUT VALUE: DOUBLE-BYTE TEXT

↓

TITLE: FIRST NAME (KANJI CHARACTER)  COMMENT: FIRST NAME (KANJI CHARACTER)
ACTION: TEXT  INPUT VALUE: DOUBLE-BYTE TEXT

↓

TITLE: LAST NAME (KATAKANA CHARACTER)  COMMENT: LAST NAME (KATAKANA CHARACTER)
ACTION: TEXT  INPUT VALUE: DOUBLE-BYTE KANA

↓

TITLE: FIRST NAME (KATAKANA CHARACTER)  COMMENT: FIRST NAME (KATAKANA CHARACTER)
ACTION: TEXT  INPUT VALUE: DOUBLE-BYTE KANA

⋮

OMITTED

⋮

TITLE: PIN (1)  COMMENT: PIN
ACTION: TEXT  INPUT VALUE: FOUR DIGITS

↓

TITLE: FOR CONFIRMATION  COMMENT: PLEASE ENTER AGAIN FOR CONFIRMATION.
ACTION: TEXT  INPUT VALUE: FOUR DIGITS

↓

TITLE: NEXT  COMMENT: NEXT
ACTION: NONE

FIG. 24B (APPLICATION FOR FAMILY CARD)

TITLE: CARD BRAND  COMMENT: CARD BRAND
ACTION: SELECT FROM LIST  INPUT VALUE: XXX/YYY
▼
TITLE: PIN  COMMENT: PIN
ACTION: TEXT  INPUT VALUE: FOUR DIGITS
▼
TITLE: FOR CONFIRMATION  COMMENT: PLEASE ENTER AGAIN FOR CONFIRMATION
ACTION: TEXT  INPUT VALUE: FOUR DIGITS
▼
TITLE: PURPOSE OF CONDUCTING TRANSACTION
COMMENT: PURPOSE OF CONDUCTING TRANSACTION  ACTION: SELECT
INPUT VALUE: COST-OF-LIVING SETTLEMENT/BUSINESS EXPENSE SETTLEMENT
▼
TITLE: PAYMENT DATE  COMMENT: PAYMENT DATE
ACTION: SELECT  INPUT VALUE: 10th / 26th
▼
TITLE: FAMILY CARD  COMMENT: FAMILY CARD
ACTION: SELECT  INPUT VALUE: AGREE AND APPLY / DO NOT APPLY
▼
TITLE: LAST NAME (KANJI CHARACTER)  COMMENT: LAST NAME (KANJI CHARACTER)
ACTION: TEXT  INPUT VALUE: DOUBLE-BYTE TEXT
▼
TITLE: FIRST NAME (KANJI CHARACTER)  COMMENT: FIRST NAME (KANJI CHARACTER)
ACTION: TEXT  INPUT VALUE: DOUBLE-BYTE TEXT
▼
TITLE: LAST NAME (KATAKANA CHARACTER)
COMMENT: LAST NAME (KATAKANA CHARACTER)
ACTION: TEXT  INPUT VALUE: DOUBLE-BYTE KANA
▼
TITLE: FIRST NAME (KATAKANA CHARACTER)
COMMENT: FIRST NAME (KATAKANA CHARACTER)
ACTION: TEXT  INPUT VALUE: DOUBLE-BYTE KANA

OMITTED

▼
TITLE: PIN (1)  COMMENT: PIN
ACTION: TEXT  INPUT VALUE: FOUR DIGITS
▼
TITLE: FOR CONFIRMATION
COMMENT: PLEASE ENTER AGAIN FOR CONFIRMATION.
ACTION: TEXT  INPUT VALUE: FOUR DIGITS
▼
TITLE: NEXT  COMMENT: NEXT  ACTION: NONE

TITLE: CONDITION  COMMENT:
ACTION: SELECT (TRUE / FALSE)  CONDITION: NOT ENTERED

TITLE: CONDITION  COMMENT:
ACTION: SELECT (TRUE / FALSE)
CONDITION: FAMILY CARD = AGREE AND APPLY

INFORMATION PROCESSING APPARATUS, FLOW GENERATION METHOD, AND COMPUTER PROGRAM PRODUCT

CROSS-REFERENCE TO RELATED APPLICATION

This patent application is based on and claims priority pursuant to 35 U.S.C. § 119(a) to Japanese Patent Application No. 2021-135838, filed on Aug. 23, 2021, in the Japan Patent Office, the entire disclosure of which is hereby incorporated by reference herein.

BACKGROUND

Technical Field

Embodiments of the present disclosure relate to an information processing apparatus, a flow generation method, and a computer program product.

Related Art

Currently, a technology called robotic process automation (RPA) is common to improve the productivity of business. In RPA, software robots learn routine tasks that humans perform using a keyboard or a mouse, and the software robots execute computer operation instead of the human to implement task automation.

SUMMARY

An embodiment of the present disclosure includes an information processing apparatus including circuitry. The circuitry displays one or more screens that receive an operation by a user. The circuitry identifies an operation item corresponding to the operation based on display information of the one or more screens, according to the operation on the one or more screens. The circuitry generates an operation component associated with a condition corresponding to the operation item. The circuitry generates a flow of operations based on the operation component according to an order of operations including the operation by the user, the flow of operations being a flow to be processed by a computer that executes an application. The circuitry compares multiple flows including the generated flow with one another, to extract a difference between multiple operation components including the generated operation component included in one of the multiple flows and multiple operation components included in another one of the multiple flows. The circuitry adds an operation component of a conditional branch before one of the multiple operation components, the one of the multiple operation components being a component for which the difference is extracted.

An embodiment of the present disclosure includes a flow generation method performed by an information processing apparatus. The method includes displaying one or more screens that receive an operation by a user. The method includes identifying an operation item corresponding to the operation based on display information of the one or more screens, according to the operation on the one or more screens. The method includes generating an operation component associated with a condition corresponding to the operation item. The method includes generating a flow of operations based on the operation component according to an order of operations including the operation by the user, the flow of operations being a flow to be processed by a computer that executes an application. The method includes comparing multiple flows including the generated flow with one another, to extract a difference between multiple operation components including the generated operation component included in one of the multiple flows and multiple operation components included in another one of the multiple flows. The method includes adding an operation component of a conditional branch before one of the multiple operation components, the one of the multiple operation components being a component for which the difference is extracted.

An embodiment of the present disclosure includes a computer program product for being executed on an information processing apparatus, including instructions, which, when executed by the information processing apparatus, cause the information processing apparatus to carry out a flow generation method. The method includes displaying one or more screens that receive an operation by a user. The method includes identifying an operation item corresponding to the operation based on display information of the one or more screens, according to the operation on the one or more screens. The method includes generating an operation component associated with a condition corresponding to the operation item. The method includes generating a flow of operations based on the operation component according to an order of operations including the operation by the user, the flow of operations being a flow to be processed by a computer that executes an application. The method includes comparing multiple flows including the generated flow with one another, to extract a difference between multiple operation components including the generated operation component included in one of the multiple flows and multiple operation components included in another one of the multiple flows. The method includes adding an operation component of a conditional branch before one of the multiple operation components, the one of the multiple operation components being a component for which the difference is extracted.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is a diagram illustrating an example of a procedure for generating a flow to be processed by a BOT;

FIG. 5 is a diagram illustrating an example of a procedure for generating a flow to be processed by a BOT, according to an embodiment of the present disclosure;

FIG. 8A and FIG. 8B are diagrams for describing an example of analysis processing performed at the time of generating a component, according to an embodiment of the present disclosure;

FIG. 9A, FIG. 9B, and FIG. 9C are diagrams for describing examples of operations performed with respect to a screen by a user such as an administrator and operations to be recorded with a recording function, according to an embodiment of the present disclosure;

FIG. 10A, FIG. 10B, and FIG. 10C are diagrams for describing an example of processing for generating a conditional branch, according to an embodiment of the present disclosure;

FIG. 15A and FIG. 15B are diagrams for describing examples of variations of a creation of a component, according to an embodiment of the present disclosure;

FIG. 16A, FIG. 16B, and FIG. 16C are diagrams for describing examples of variations of a creation of a component, according to an embodiment of the present disclosure;

FIG. 17A and FIG. 17B are diagrams for describing examples of variations of a creation of a component, according to an embodiment of the present disclosure;

FIG. 18 is a diagram for describing other examples of operations performed with respect to a screen by a user such as an administrator and operations to be recorded with the recording function, according to an embodiment of the present disclosure;

FIG. 21 is an illustration of an example of a screen that receives an operation from a user such as an administrator, according to an embodiment of the present disclosure;

FIG. 23 is a diagram illustrating examples of components automatically generated based on operations recorded with a recording function, according to an embodiment of the present disclosure;

FIG. 24A, FIG. 24B, and FIG. 24C are diagrams for describing an example of processing for generating a conditional branch, according to an embodiment of the present disclosure;

Figure 1A:
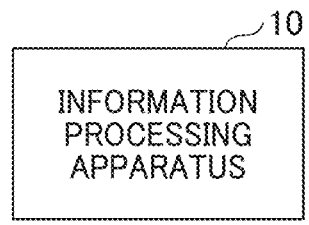
FIG. 1A and FIG. 1B are schematic diagrams each illustrating an example of a configuration of an information processing system, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the drawings, embodiments of the present disclosure are described.

First Embodiment

Figure 1B:
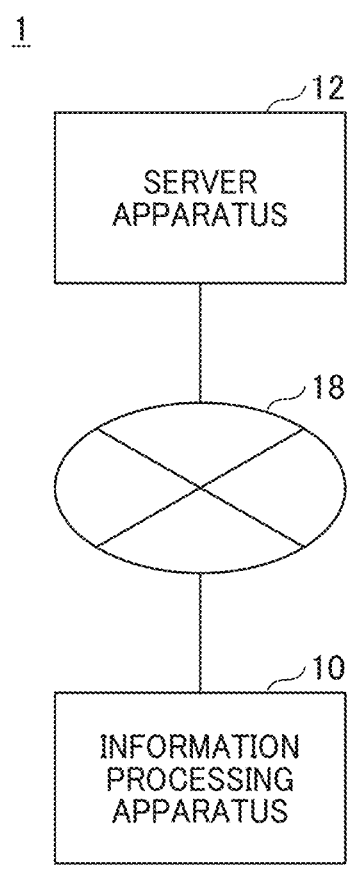

System Configuration:

FIG. 1A and FIG. 1B are schematic diagrams each illustrating an example of a configuration of an information processing system, according to the present embodiment. The information processing system according to the present embodiment includes an information processing apparatus 10 as illustrated in FIG. 1A or an information processing system 1 as illustrated in FIG. 1B. The information processing apparatus 10 illustrated in FIG. 1A is a computer such as a personal computer (PC) operated by a user such as an administrator. The information processing apparatus 10 receives an operation input by the user with a touch panel, a controller, a mouse, a keyboard, or a combination of these, executes information processing according to the operation, and displays a result of the execution.

The information processing system 1 illustrated in FIG. 1B includes the information processing apparatus 10 and a server apparatus 12, which are communicably connected to each other through a network 18 such as the Internet or a local area network (LAN). The information processing apparatus 10 illustrated in FIG. 1B is a computer similar to the information processing apparatus 10 illustrated in FIG. 1A. The server apparatus 12 illustrated in FIG. 1B is also implement by a computer similar to the computer illustrated in FIG. 1A.

The server apparatus 12 transmits and receiving data to and from the information processing apparatus 10, to execute information processing according to a user's operation received by the information processing apparatus 10 and provide a result of the execution to the information processing apparatus 10. The information processing apparatus 10 displays the result of the execution provided from the server apparatus 12.

The server apparatus 12 can be implemented by a cloud computer. Although FIG. 1B illustrates an example in which a single server apparatus 12 is provided, this is merely one example. In another example, two or more server apparatuses 12 performs distributed processing. The server apparatus 12 can be used for downloading processing of, for example, a program (application) and/or a web page, to the information processing apparatus 10. The server apparatus 12 can be also used for login processing of a user, and/or processing of managing various databases, for example. The system configuration illustrated in FIG. 1 is merely one example.

Examples of the information processing apparatus 10 is a PC, a mobile phone, a smartphone, a tablet terminal, a game console, a personal digital assistant (PDA), and a wearable PC, which are operated by the user.

Figure 2:
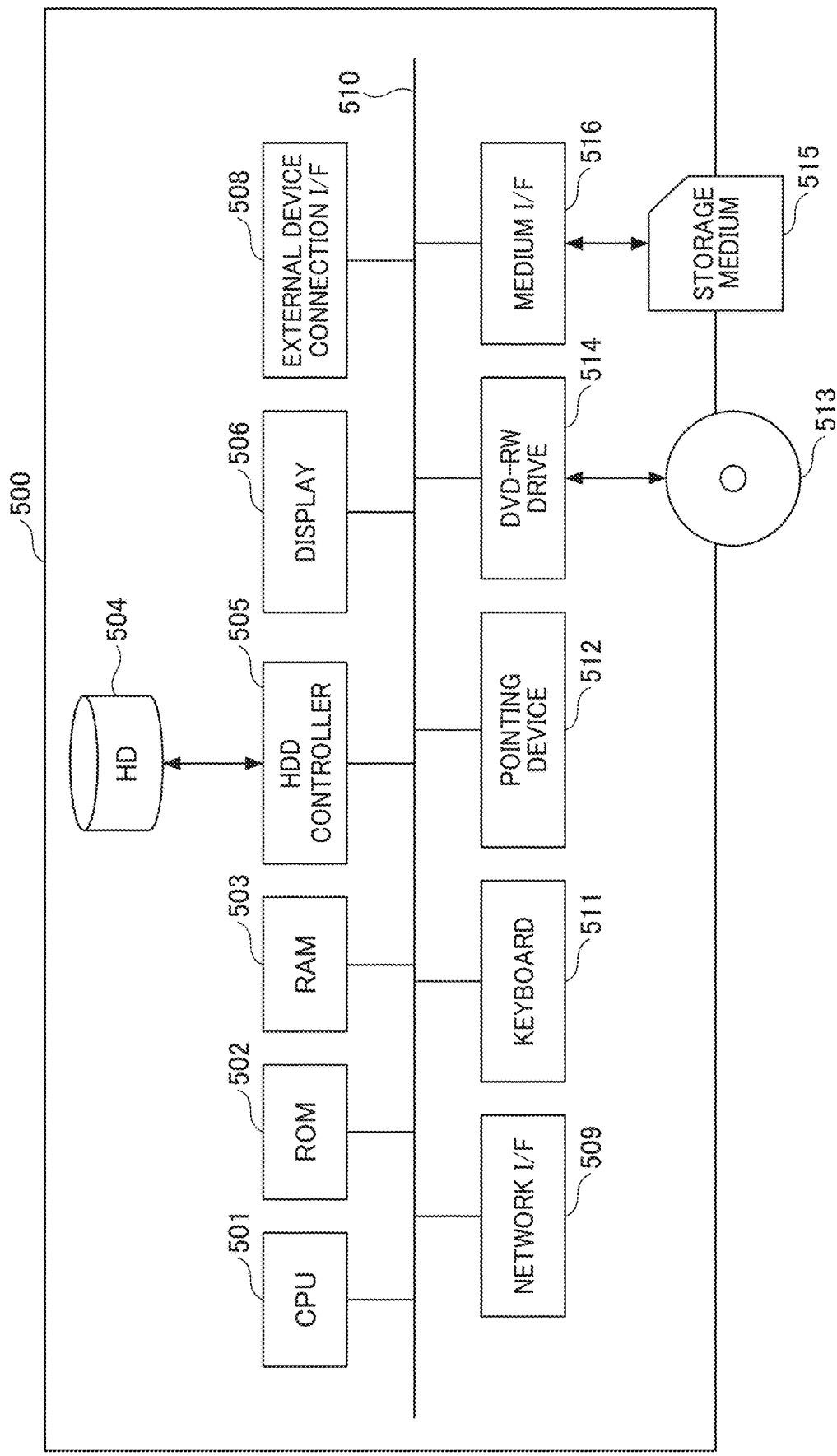
FIG. 2 is a block diagram illustrating an example of a hardware configuration of a computer, according to an embodiment of the present disclosure.

Hardware Configuration:
Hardware Configuration of Computer:

The information processing apparatus 10 of FIG. 1 is implemented by, for example, a computer 500 having a hardware configuration as illustrated in FIG. 2. The server apparatus 12 have the same or substantially the same hardware configuration of the hardware configuration of the information processing apparatus 10, and a redundant description thereof is omitted below. FIG. 2 is a block diagram illustrating an example of a hardware configuration of the computer 500, according to the present embodiment.

The computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a medium I/F 516.

The CPU 501 performs overall control of the computer 500 according to a program. The ROM 502 stores a program such as an initial program loader (IPL) to boot the CPU 501. The RAM 503 is used as a work area for the CPU 501. The HD 504 stores various data such as a program. The HDD controller 505 controls reading or writing of various data with respect to the HD 504 under control of the CPU 501.

The display 506 displays various information such as a cursor, a menu, a window, a character, or an image. The external device connection I/F 508 is an interface that connects the computer as the information processing apparatus 10 to various external devices. Examples of the external devices include, but are not limited to, a universal serial bus (USB) memory. The network I/F 509 is an interface for performing data communication using the network 18. Examples of the data bus 510 include, but are not limited to, an address bus and a data bus, which electrically connects the components, such as the CPU 501, with one another.

The keyboard 511 is an example of an input device provided with a plurality of keys that allows a user to input characters, numerals, or various instructions. The pointing device 512 is an example of an input device that allows a user to select or execute a specific instruction, select a target for processing, or move a cursor being displayed. The DVD-RW drive 514 controls reading and writing of various data from and to a DVD-RW 513, which is an example of a removable storage medium. The DVD-RW is merely one example of the removable storage medium. In another example, a digital versatile disk recordable (DVD-R) is used as the removable storage medium. The medium I/F 516 controls reading and writing (storing) of data from and to a storage medium 515 such as a flash memory.

The hardware configuration of the information processing apparatus 10 illustrated in FIG. 2 is merely one example, and the information processing apparatus may not include all of the components illustrated in FIG. 2, or may include any hardware components in addition to the components illustrated in FIG. 2.

Figure 3:
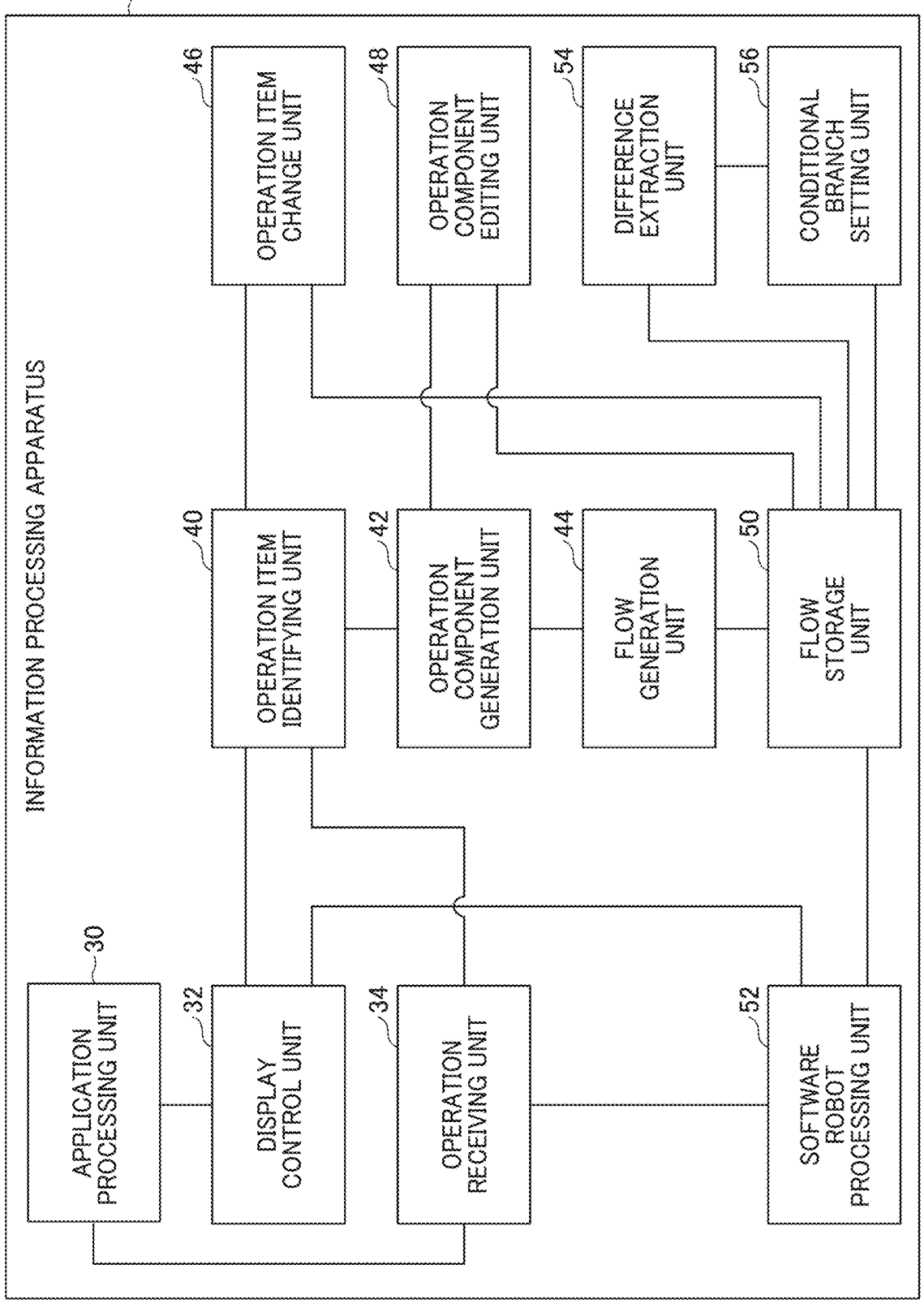
FIG. 3 is a block diagram illustrating an example of a functional configuration of an information processing apparatus, according to an embodiment of the present disclosure.

Functional Configuration:

An example of a functional configuration of the information processing apparatus 10 illustrated in FIG. 1A is described below. The functional configuration illustrated in FIG. 3 is merely one example. In another example, for the information processing system 1 illustrated in FIG. 1B, the server apparatus 12 of FIG. 1B includes at least a part of the functional configuration illustrated in FIG. 3, and the information processing apparatus 10 and the server apparatus 12 perform processing in cooperation with each other.

FIG. 3 is a block diagram illustrating an example of a functional configuration of the information processing apparatus 10, according to the present embodiment. In the description of the functional configuration illustrated in FIG. 3, descriptions of components unnecessary for the description of the present embodiment may be omitted. For example, the information processing apparatus 10 implements the functional configuration of FIG. 3 by executing programs such as an operating system (OS) and an application.

The information processing apparatus 10 illustrated in FIG. 3 includes an application processing unit 30, a display control unit 32, an operation receiving unit 34, an operation item identifying unit 40, an operation component generation unit 42, a flow generation unit 44, an operation item change unit 46, an operation component editing unit 48, a flow storage unit 50, a software robot processing unit 52, a difference extraction unit 54, and a conditional branch setting unit 56.

The application processing unit 30 is an example of a function implemented by a program or service to be operated by the software robot processing unit 52. The program or services to be operated by the software robot processing unit 52 can be multiple programs or services.

The display control unit 32 displays one or more screens based on image data received from the application processing unit 30. The display control unit 32 performs display control of one or more screens that receive an operation from the user. The operation receiving unit 34 receives a user's operation with respect to the screen displayed by the display control unit 32.

The operation item identifying unit 40 receives information on the displayed screen (display information of a screen) from the display control unit 32. Further, the operation item identifying unit 40 receives information (operation position information) relating to the user's operation on the displayed screen from the operation receiving unit 34.

The operation item identifying unit 40 identifies, among one or more operation items, a particular operation item for which the user's operation is received based on the received display information of the screen and the received operation position information. A detailed description is given later of the operation items. The operation item change unit 46 receives the user's operation of changing the operation item identified by the operation item identifying unit 40, to change the identified operation item.

The operation component generation unit 42 generates an operation component described below associated with a condition corresponding to the identified operation item. A detailed description is given later of the operation component. The operation component editing unit 48 receives the user's operation for editing the operation component generated by the operation component generation unit 42, to edit the operation component.

The flow generation unit 44 generates a flow as described below from the operation components according to an order of operations by the user. The flow storage unit 50 stores the generated flow. The difference extraction unit 54 compares multiple flows stored in the flow storage unit 50 with one another, to extract a difference between operation components of one of the multiple flows and operation components of another one of the multiple flows, as described later. The conditional branch setting unit 56 sets (adds) an operation component of a conditional branch to the flow as described later based on the difference between the operation components extracted by the difference extraction unit 54, and stores the generated operation component of the conditional branch in the flow storage unit 50. A detailed description is given later of processing performed by the difference extraction unit 54 and the conditional branch setting unit 56.

The software robot processing unit 52 reads the flow from the flow storage unit 50. The software robot processing unit 52 displays a screen described later based on the read flow, and receives the user's operation with respect to the screen. The software robot processing unit 52 performs an operation on the operation receiving unit 34 according to the received user's operation, to cause the application processing unit 30 to execute processing.

Generation of Flow to be Processed by BOT:

In the present embodiment, a BOT is an example of software that simplifies a user's operation for performing processing according to a flow. The BOT is sometimes referred to as a "software robot." In the embodiment, a flow of operations to be processed by the BOT is described as an example. In the following description, the flow of operation to be processed by the BOT may be referred to simply as a "flow." The flow to be processed by the BOT is generated typically, for example, as illustrated in FIG. 4.

FIG. 4 is a diagram illustrating an example of a procedure for generating a flow to be processed by the BOT. The flow to be processed by the BOT may be a flow for simplifying an operation on a desktop application or a flow for simplifying an operation on a cloud service.

In FIG. 4, an RPA service for simplifying a business process is described as an example. It is assumed that this RPA service provides frequently used flows as templates.

In a first step in the procedure for generating the flow to be processed by the BOT, a user such as an administrator selects a desired template. In the next step, the user such as the administrator adds a component and configures settings of the component. In the example of FIG. 4, the adding and configuring the setting of the component are performed in the order of adding a component, configuring input settings, and configuring output settings. In the procedure illustrated in FIG. 4, the input settings and the output settings are added for each component. The component is an example of an operation component displayed on a screen. For the component, various definitions such input settings and output settings can be made.

After the addition of the component, the configuration of the input settings and the configuration of the output settings are performed. The input settings are settings for defining a type of a character string to be input. The output settings are settings for defining a type of a character string to be output. In the procedure illustrated in FIG. 4, the configuration of required input settings and the configuration of required output settings are performed for each of the added components. The procedure for adding the components and configuring the settings is repeated for required dialogues. In the next step, the user such as the administrator rearranges the components and adds conditions or the like, to generate the flow.

In the procedure for generating the BOT flow as described with reference to FIG. 4, the process of adding a component and the process of configuring settings are to be performed one by one for required dialogues. Further, in the procedure of generating the flow to be processed by the BOT described with reference to FIG. 4, the user such as the administrator has to rearrange components and add conditions or the like, to generate the flow.

To address the issue as described above, in the present embodiment, a flow to be processed by the BOT is generated as illustrated in FIG. 5. FIG. 5 is a diagram illustrating an example of a procedure for generating a flow to be processed by the BOT, according to the present embodiment. In the procedure of FIG. 5, a recording function for recording a series of operations such as a click or an input by a user with respect to a screen such as a web page using, for example, a mouse or a keyboard is used.

In the first step of the procedure for generating the flow to be processed by the, a user such as an administrator starts recording using a recording function and then performs operations with respect to the screen such as a web page. The recording function records operation information such as an operation log and operation target information such as a position being operated. In the next step, the information processing apparatus 10 automatically generates a component from the recorded operation information and operation target information.

When the component is automatically generated, the information processing apparatus 10 configure component settings including input settings, output settings, and processing settings. The information processing apparatus 10 generates the input settings based on the operation information and the operation target information. In the input settings, information such as a validation check and a list is inherited. The information processing apparatus 10 configures the output setting as needed. Further, the information processing apparatus 10 configures processing settings for combining components and adding processing to input conditions, for example.

In the next step, the information processing apparatus 10 automatically generates a flow according to an order of operations by the user such as the administrator. The information processing apparatus 10 may receive an operation such as changing the order of a flow or adding a condition from the user such as the administrator.

By generating the flow to be processed by the BOT as illustrated in FIG. 5, in the present embodiment, necessary components are automatically generated by performing operations with respect to a screen such as a web page. For example, in the present embodiment, input conditions of a web page or the like are inherited. This reduces time and efforts to configure input settings. Further, in the present embodiment, a flow is automatically generated from the component according to an order of operation by the user such as the administrator.

As described above, in the present embodiment, by using the recording function, the information processing apparatus 10 records the operation information indicating operations with respect to a screen such as a web page by the user such as the administrator and the operation target information, generates a component, and automatically generate a flow by associating the components according to an order of operations by the user such as the administrator.

Figure 6A:
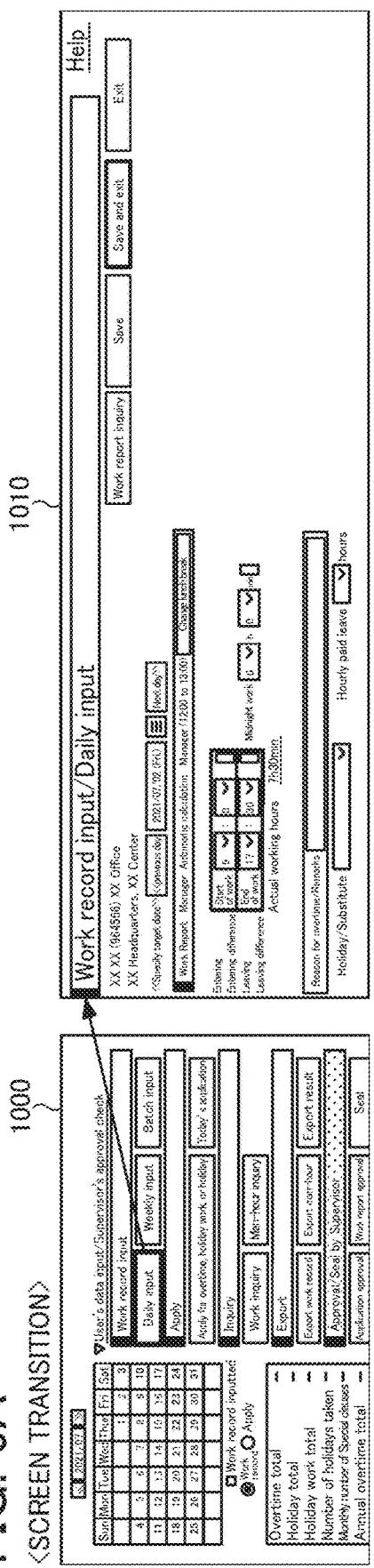
FIG. 6A, FIG. 6B, and FIG. 6C are diagrams for describing examples of operations performed with respect to a screen by a user such as an administrator and operations to be recorded with a recording function, according to an embodiment of the present disclosure.
Figure 6B:
Figure 6C:
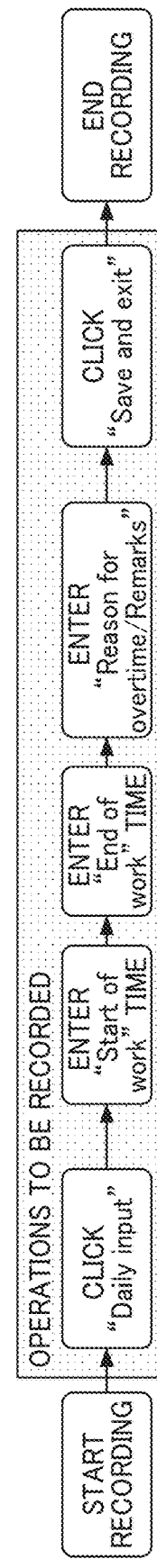

Operation and Recording Function:

A description is now given of examples of operations performed with respect to a screen by a user such as an administrator. FIG. 6A to FIG. 6C are diagrams for describing examples of operations with respect to a screen by a user such as an administrator and operations to be recorded with the recording function.

FIG. 6A illustrates an example of how a screen 1000 transitions to a screen 1010 in response to receiving an operation from the user such as the administrator. FIG. 6B illustrates a flow of a series of operations performed by the user such as the administrator with respect to the screen 1000 and the screen 1010 illustrated in FIG. 6A. FIG. 6A and FIG. 6B illustrate a screen transition from the screen 1000 on the left of FIG. 6A to the screen 1010 on the right of FIG. 6A in response to an operation by the user such as the administrator of clicking a "Daily input" button on the screen 1000 and the user's input operation on the screen 1010.

Further, FIG. 6A and FIG. 6B illustrate operations by the user such the administrator of performing inputs to entry fields of "Start of work", "End of work", and "Reason for overtime/Remarks" with respect to the screen 1010 of FIG. 6A. Furthermore, FIG. 6A and FIG. 6B illustrate an operation by the user such as the administrator of clicking a "Save and exit" button with respect to the screen 1010 illustrated in FIG. 6A.

For example, a flow of a series of the operations by the user such as the administrator illustrated in FIG. 6A and FIG. 6B is recorded by starting and ending recording with the recording function as illustrated in FIG. 6C.

Figure 7A:
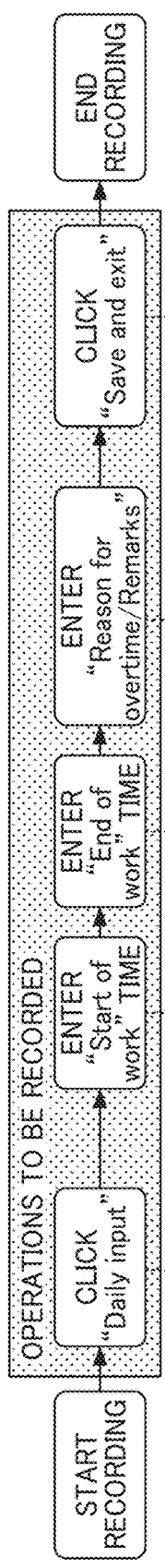
FIG. 7A and FIG. 7B are diagrams for describing an example of processing for generating components based on a flow of a series of recorded operations, according to an embodiment of the present disclosure.
Figure 7B:
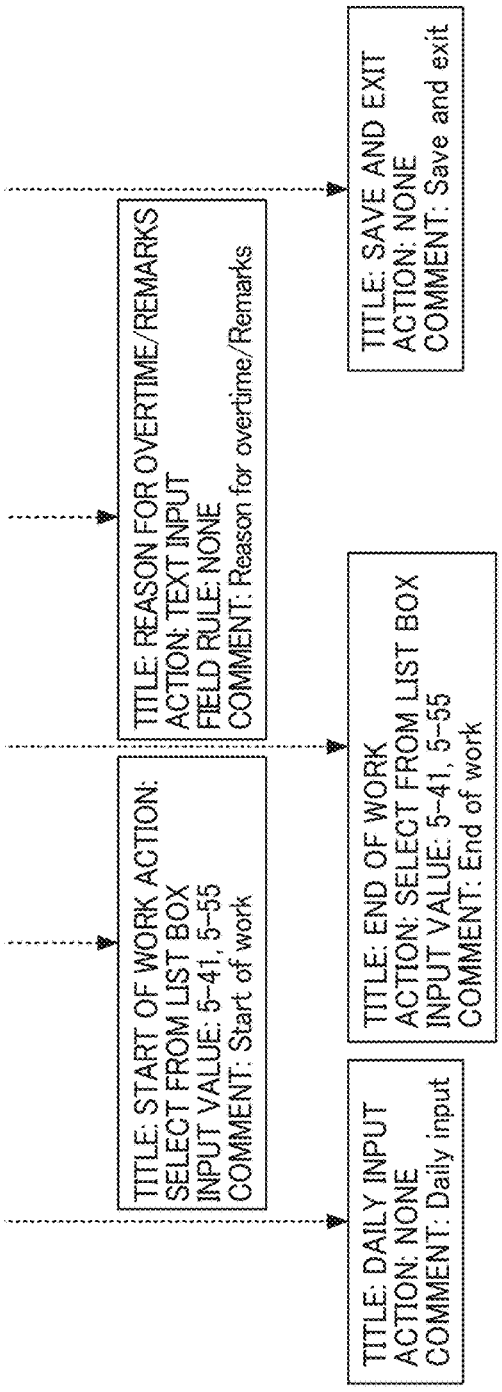

FIG. 7A and FIG. 7B are diagrams for describing an example of processing for generating components from the flow of a series of recorded operations. FIG. 7A, which is the same as FIG. 6C, illustrates the flow of a series of operations by the user such as the administrator recorded with the recording function. Each of the operations recorded with the recording function is an example of the operation item. FIG. 7B illustrates examples of components automatically generated from the operations recorded with the recording function.

The information processing apparatus 10 generates a component including, as information, "title: daily input", "action: none", and "comment: daily input", for example, based on a record of an operation indicating that the user such as the administrator clicks the "Daily input" button on the screen 1000 of FIG. 6A.

The information processing apparatus 10 further generates a component including, as information, "title: start of work", "action: select from list box", and "input value: 5-41, 5-55", based on a record of an operation indicating that the user such as the administrator enters a time in the entry field of "Start of work" with respect to the screen 1010 of FIG. 6A.

The information processing apparatus 10 further generates a component including, as information, "title: end of work", "action: select from list box", and "input value: 5-41, 5-55", based on a record of an operation indicating that the user such as the administrator enters a time in the entry field of "End of work" with respect to the screen 1010 of FIG. 6A.

The information processing apparatus 10 further generates a component including, as information, "title: reason for overtime/remarks", "action: text input", and "field rule: none", based on a record of an operation indicating that the user such as the administrator enters a time in the entry field of "Reason for overtime/Remarks" with respect to the screen 1010 of FIG. 6A.

The information processing apparatus 10 generates a component including, as information, "title: save and exit", "action: none", and "comment: save and exit", for example, based on a record of an operation indicating that the user such as the administrator clicks the "Save and exit" button on the screen 1010 of FIG. 6A.

Although in the example of FIG. 7A and FIG. 7B, the "input value" is "5-41, 5-55" based on the record of the operation of inputting the time in the entry fields of "Start of work" and "End of work", in another example, any other suitable number within an input range of the input value such as "1-99" may be used.

In the embodiment, as an example of analysis processing performed at the time of generating a component, a description is given of a case in which a component is generated based on a record of an operation of inputting a time to the entry field of "Start of work" with respect to the screen 1010 of FIG. 6A. In other words, a case of the start of work is described. Further, as an example of analysis processing performed at the time of generating a component, a description is given of a case in which a component is generated based on a record of an operation of inputting text to the entry field of "Reason for overtime/Remarks" with respect to the screen 1010 of FIG. 6A. In other word, a case of the reason for overtime/remarks is described.

FIG. 8A and FIG. 8B are diagrams for describing an example of analysis processing performed at the time of generating a component. FIG. 8A is a diagram for describing an example of a case of the start of work. FIG. 8B is a diagram for describing an example of a case of the reason for overtime/remarks.

For example, in the case of start of work, in response to detecting an operation performed with respect to the screen 1010 illustrated in FIG. 6A by the user such as the administrator, the information processing apparatus 10 analyzes an entry field operated by the user such as the administrator as follows, thereby creating a component.

First, the information processing apparatus 10 searches for character strings in the vicinity of the entry field of the start of work, to extract the character strings in the vicinity of the entry field as candidates for the title. For example, in the example of FIG. 8A, the character strings "Start of work", "Manager", and "Automatic calculation" are extracted as the candidates for the title. The information processing apparatus 10 can temporarily set, for example, the character string "Start of work", which is nearest to the entry field of the start of work among the extracted candidates for the title, as a title.

Note that an existing method can be used to search for the neighboring character strings. For example, character strings arranged near the entry field of the start of work are searched for from information that is extracted with a technology of web scraping. For example, a method described in "The Data Journalism Handbook," Web page datajournalism.com, March 2012, pp. 108-112 can be used as a method of searching for character strings in the vicinity of an entry field on a web page.

The vicinity of the entry field is positions near the entry field (within a predetermined range from the entry field) as indicated by arrows in FIG. 8A. The information processing apparatus 10 extracts character strings in an area within the predetermined range from the entry field of "Start of work" based on position information on the character strings, to search for character strings arranged in the neighborhood of the entry field of "Start of work". An order of priority may be assigned to the extracted character strings. For example, the order of priority is assigned based on a direction viewed from the entry field, such as giving priority to a character string at the upper right of the entry field.

Next, the information processing apparatus 10 analyzes the entry field of "Start of work". For example, FIG. 8A illustrates an example in which the entry field is a list box. The information processing apparatus 10 acquires a list of input values (5 to 41, 0 to 55), for example. The information processing apparatus 10 generates a component based on the entry field of "Start of work", the character strings in the vicinity of the entry field, and the analysis result of the entry field.

For example, in the case of the reason for overtime/remarks, in response to detecting an operation performed with respect to the screen 1010 illustrated in FIG. 6A by the user such as the administrator, the information processing apparatus 10 analyzes an entry field operated by the user such as the administrator as follows, thereby creating a component.

The information processing apparatus 10 searches for character strings in the vicinity of the entry field of the reason for overtime/remarks, to extract the character strings in the vicinity of the entry field as candidates for the title. For example, in the example of FIG. 8B, the character strings "Reason for overtime/Remarks", "Actual working hours", and "7 h 30 min", are extracted as the candidates for the title. The information processing apparatus 10 can temporarily set, for example, the character string "Reason for overtime/Remarks", which is nearest to the entry field of the reasons for overtime/remarks among the extracted candidates for the title, as a title.

Next, the information processing apparatus 10 analyzes the entry field of "Reason for overtime/Remarks". For example, FIG. 8B illustrates an example in which the entry field is a text box, and the information processing apparatus 10 acquires validation of the entry field. The validation of the entry field is information for determining whether an input character string is valid in view of rules such as specifications and grammar. The information processing apparatus 10 generates a component based on the entry field of "Reason for overtime/Remarks", the character strings in the vicinity of the entry field, and the analysis result of the entry field.

Next, as illustrated in FIG. 9A to FIG. 9C, the user such as the administrator performs operations different from those described with reference to FIG. 6A to FIG. 6C with respect to the screen, to cause a conditional branch different from that described with reference to FIG. 6A to FIG. 6C to generate. FIG. 9A to FIG. 9C are diagrams for describing examples of operations with respect to the screen by the user such as the administrator and operations to be recorded with the recording function.

FIG. 9A illustrates an example of how the screen 1000 transitions to the screen 1010 in response to receiving an operation by the user such as the administrator. FIG. 9B illustrates a flow of a series of operations performed by the user such as the administrator with respect to the screen 1000 and the screen 1010 illustrated in FIG. 9A. FIG. 9A and FIG. 9B illustrate a screen transition from the screen 1000 on the left of FIG. 9A to the screen 1010 on the right of FIG. 9A in response to an operation by the user such as the administrator of clicking a "Daily input" button on the screen 1000, and the user's input operation with respect to the screen 1010.

Further, FIG. 9A and FIG. 9B illustrate operations by the user such the administrator of performing inputs to entry fields of "Start of work" and "End of work" with respect to the screen 1010 of FIG. 9A. Furthermore, FIG. 9A and FIG. 9B illustrate an operation by the user such as the administrator of clicking a "Save and exit" button on the screen 1010 illustrated in FIG. 9A.

For example, a flow of a series of the operations by the user such as the administrator illustrated in FIG. 9A and FIG. 9B is recorded by starting and ending recording with the recording function as illustrated in FIG. 9C.

FIG. 10A and FIG. 10B are diagrams for describing an example of processing for generating a conditional branch. FIG. 10A illustrates a flow that is automatically generated based on the components illustrated in FIG. 7B according to an order of operations performed, for example, with respect to the screen 1000 and the screen 1010 by the user such as the administrator. FIG. 10B illustrates a flow that is automatically generated based on the flow of the series of operations recorded as illustrated in FIG. 9C and is automatically generated according to the order of operations performed with respect to the screen 1000 and the screen 1010 by the user such as the administrator.

Figure 10C:
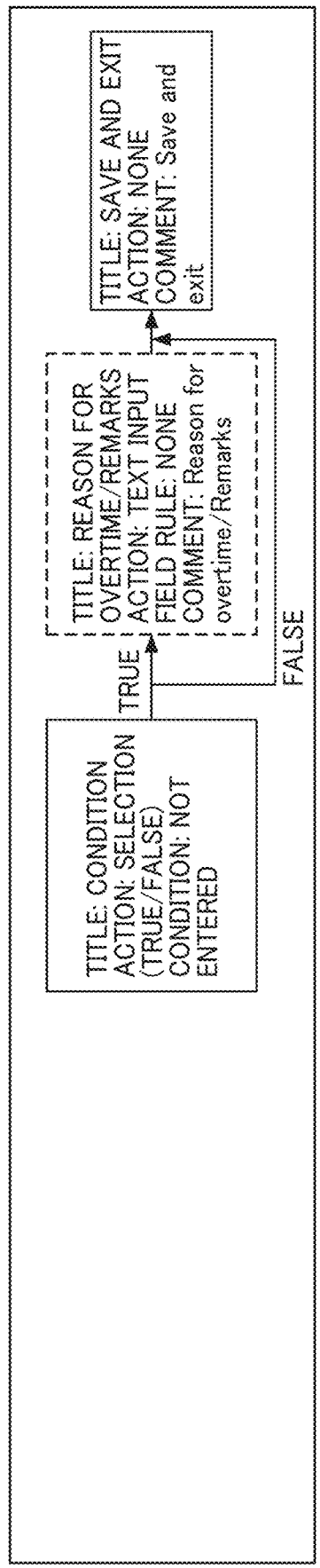

The difference extraction unit 54 compares the flow of FIG. 10A with the flow of FIG. 10B, both being stored in the flow storage unit 50. The difference extraction unit 54 extracts a component including, as information, "title: reason for overtime/remarks", "action: text input", "field rule: none", and "comment: reason for overtime/remarks" illustrated in FIG. 10C, as a difference between the operation components of the flow of FIG. 10A and the operation components of the flow of FIG. 10B.

The conditional branch setting unit 56 sets (adds) an operation component of a conditional branch before the component corresponding to the difference, based on the difference between the operation components extracted by the difference extraction unit 54. The operation component of the conditional branch is a component including, as information, "title: condition", "action: selection (True/False)", and "condition: not entered". In other words, whether the user's input to the entry field of "Reason for overtime/Remarks" is performed is one example of a predetermined condition. Further, the conditional branch setting unit 56 sets the branch of the operation component of the conditional branch so as to converge (skip) to the operation component that is after the operation component of the difference and has no difference.

Figure 11:
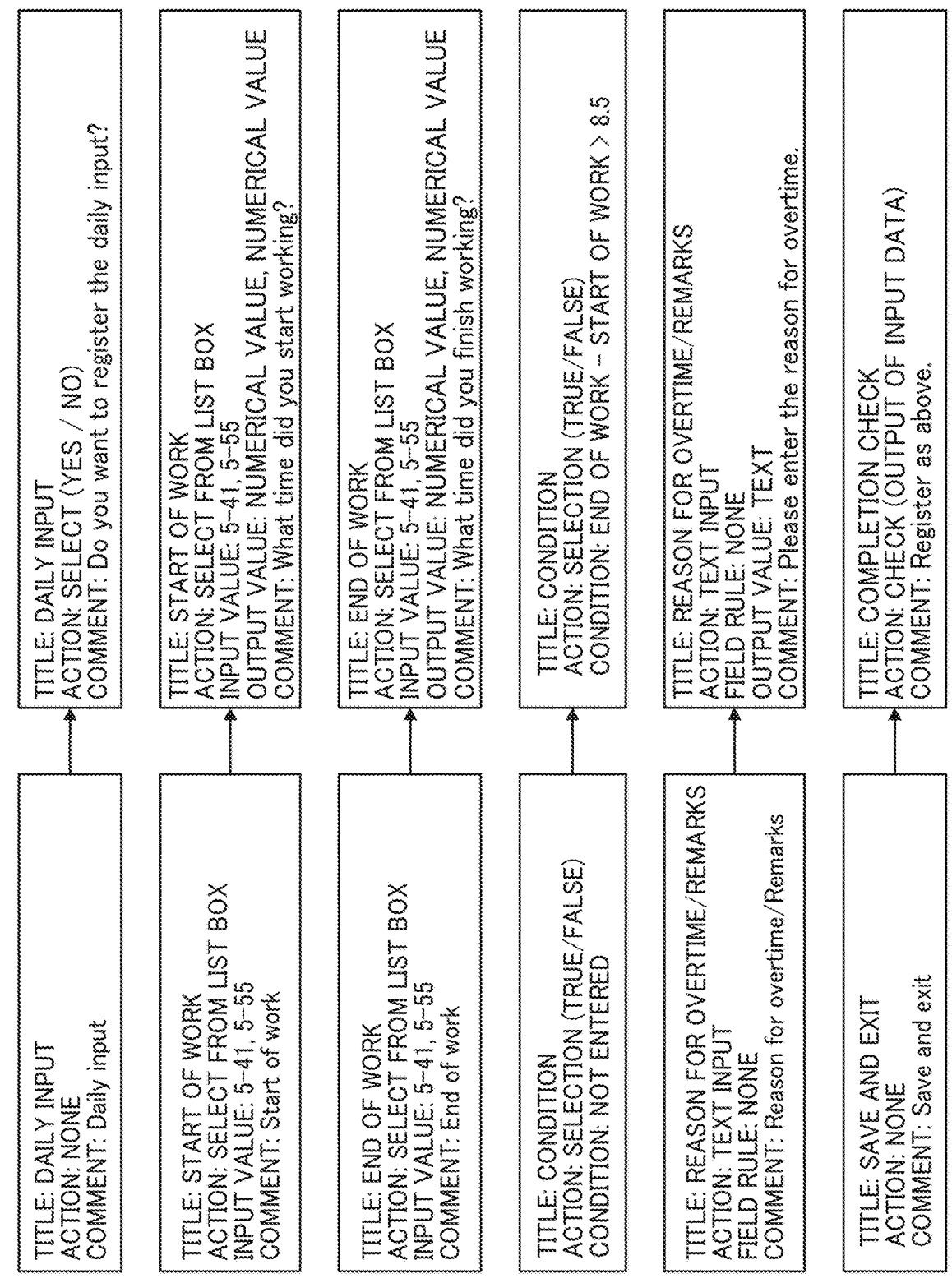
FIG. 11 is a diagram for describing an example of information of components before editing and information of components after editing, according to an embodiment of the present disclosure.

The information processing apparatus 10 according to the present embodiment accepts the user's operation of editing the information of the components included in the automatically generated flow, to edit the information of the component, for example, as illustrated in FIG. 11.

FIG. 11 is a diagram for describing an example of the information of the components before the edit and the information of the components after the edit. In FIG. 11, the information of the component before the edit is illustrated on the left side and the information of the component after the edit is illustrated on the right side.

For example, in FIG. 11, the component including, as information, "title: daily input", "action: none", and "comment: daily input", is edited to a component including, as information; "title: daily input", "action: select (yes/no)" and "comment: Do you want to register the daily input?".

Further, in FIG. 11, the component including, as information, "title: start of work", "action: select from list box", "input value: 5-41, 5-55", and "comment: start of work" is edited to a component including, as information; "title: start of work", "action: select from list box", "input value: 5-41, 5-55", "output value: numerical value, numerical value", and "comment: What time did you start working?".

Further, in FIG. 11, the component including, as information, "title: end of work", "action: select from list box", "input value: 5-41, 5-55", and "comment: end of work" is edited to a component including, as information; "title: end of work", "action: select from list box", "input value: 5-41, 5-55", "output value: numerical value, numerical value", and "comment: What time did you finish working?".

Further, in FIG. 11, a component including, as information, "title: condition", "action: selection (True/False)", and "condition: not entered" is edited to a component including "title: condition", "action: selection (True/False)", and "condition: end of work−start of work>8.5" as a condition.

Further, in FIG. 11, the component including, as information, "title: reason for overtime/remarks", "action: text input", "field rule: none", and "comment: reason for overtime/remarks" is edited to a component including, as information, "title: reason for overtime/remarks", "action: text input", "field rule: none", and "comment: Please enter the reason for overtime".

Further, in FIG. 11, a component including, as information, "title: save and exit", "action: none", and "comment: save and exit" is edited to a component including, as information, "title: completion check", "action: check (output of input data)", and "comment: Register as above".

Figure 12:
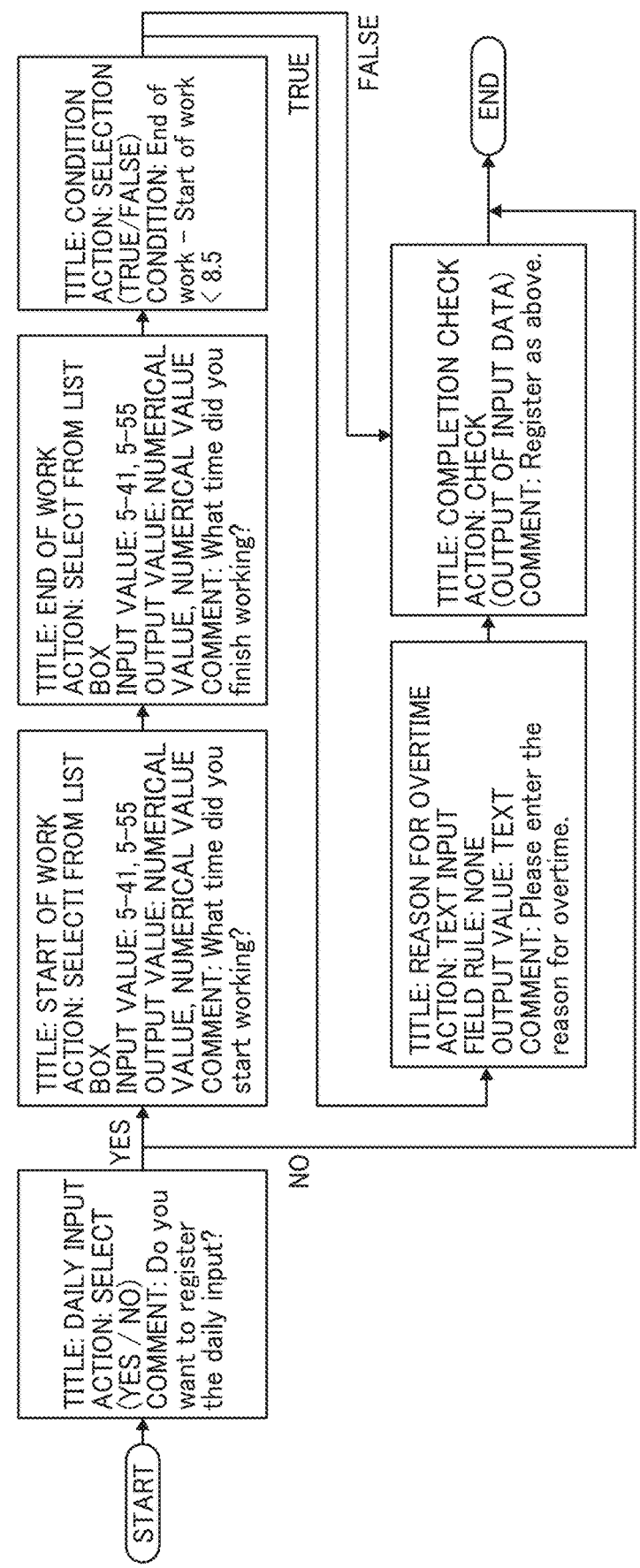
FIG. 12 is a diagram for describing an example of a flow obtained by editing information of a component, according to an embodiment of the present disclosure.

Through the edit of the component information as illustrated in FIG. 11, the information processing apparatus 10 can modify the flow before the edit to an edited flow as illustrated in FIG. 12. According to the edited flow, a determination is performed whether a value obtained from the input value in the component of the start of work and the input value in the component of the end of work exceeds "8.5" hours and processing branches based on a result of the determination.

FIG. 12 is a diagram for describing an example of a flow obtained by editing information of a component. For example, as illustrated in FIG. 12, the user such as the administrator edits the component information so that a transition destination in a case where "No" is selected in the first component is changed to the last component. Further, for example, the user such as the administrator edits the component information so that a transition destination in a case where the condition of "end of work−start of work>8.5" is satisfied in the fourth component is the component of "reason for overtime". Further, for example, the user such as the administrator edits the component information so that a transition destination in a case where the condition of "end of work−start of work>8.5" is not satisfied in the fourth component is the component of "completion check".

Figure 13:
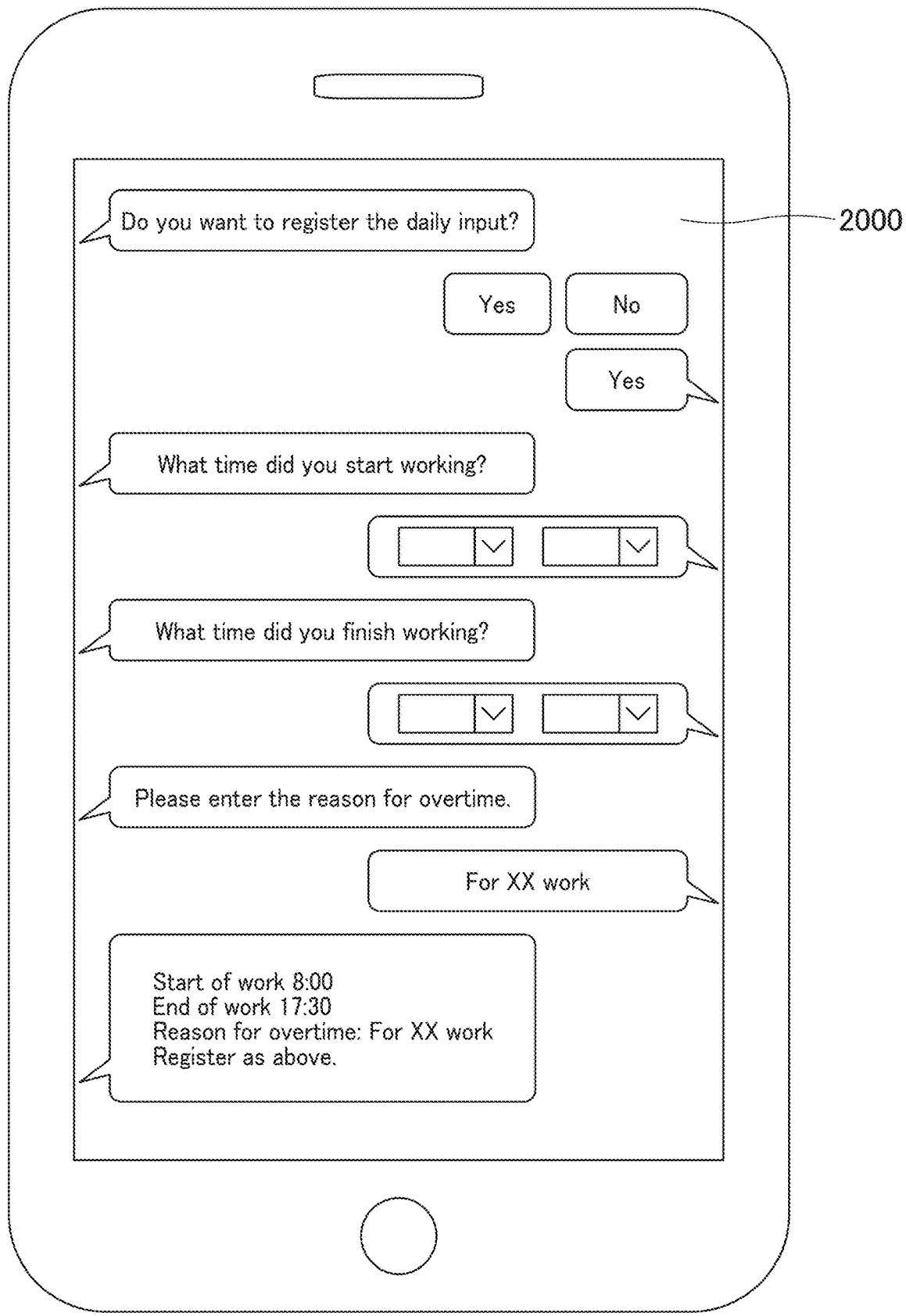
FIG. 13 is a diagram illustrating an example of a displayed screen of a flow obtained by editing information of component and regenerating the flow, according to an embodiment of the present disclosure.
Figure 14:
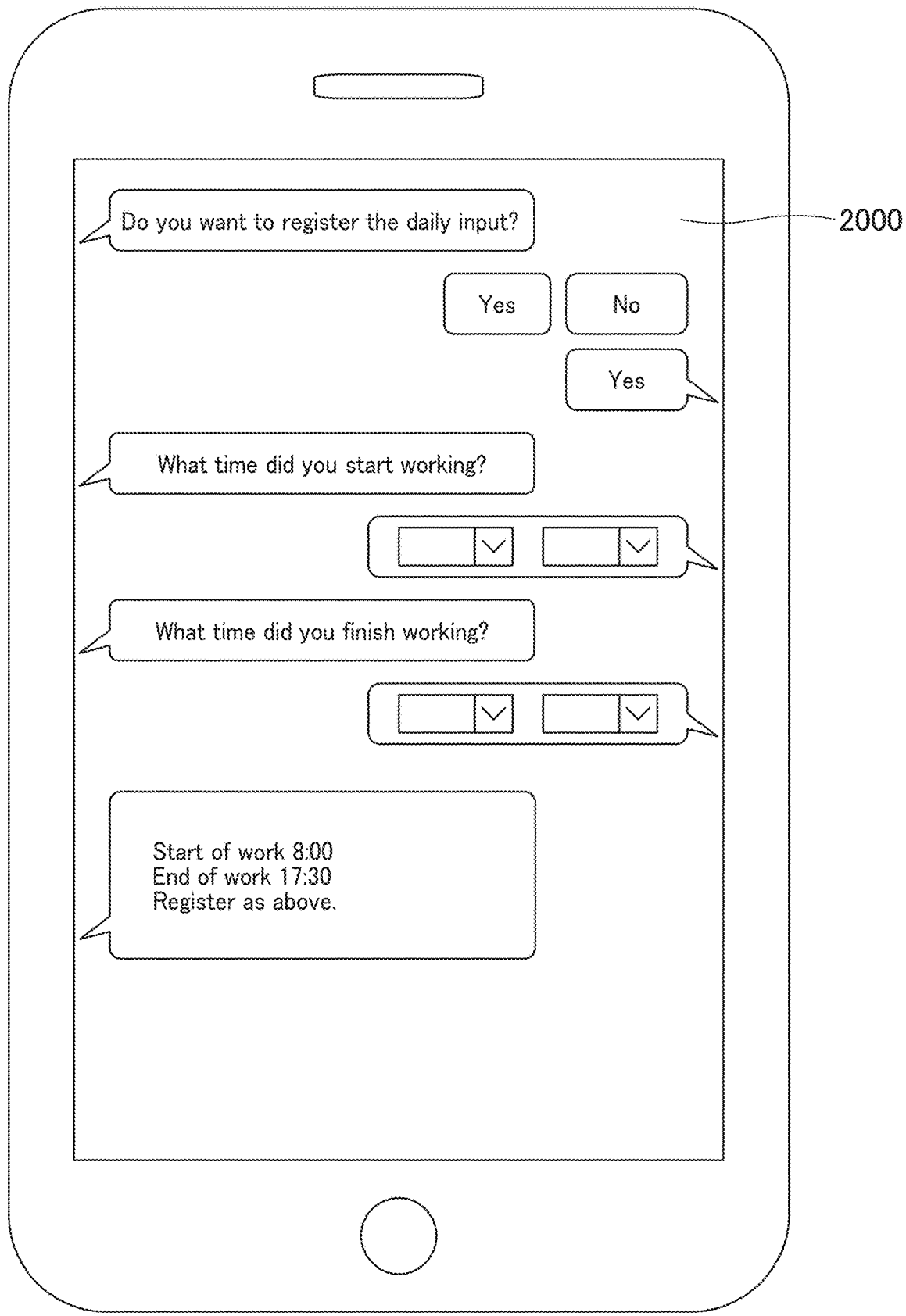
FIG. 14 is a diagram illustrating an example of a displayed screen of a flow obtained by editing information of component and regenerating the flow, according to an embodiment of the present disclosure.

FIG. 13 and FIG. 14 each illustrates an example of a displayed screen of the flow obtained by editing the information of the component and regenerating the flow. The screen 2000 illustrated in FIG. 13 and FIG. 14 is an example of a screen displayed as a result of editing the information of the components included in the automatically generated flow as illustrated in FIG. 11 in a manner that content on the screen 2000 is displayed in a dialogue format (e.g., looks like a dialogue).

The screen 2000 of FIG. 13 is an example of a flow in a case where the condition of "end of work−start of work>8.5" is satisfied in the fourth component. The screen 2000 of FIG. 14 is an example of a flow in a case where the condition of "end of work−start of work>8.5" is not satisfied in the fourth component. For example, the user executes the flow of FIG. 12 by operating the screen 2000 of FIG. 13 or FIG. 14 displayed on the information processing apparatus 10.

The analysis processing performed for creating a component as described above with reference FIG. 8A and FIG. 8B is merely one example. In another example, in response to detecting an operation on a radio button as illustrated in FIG. 15A and FIG. 15B, the information processing apparatus 10 analyzes an entry field operated by the user such as the administrator, thereby creating a component. FIG. 15A and FIG. 15B are diagrams for describing examples of variations of the creation of a component.

FIG. 15A is a diagram illustrating an example of a screen 1040 including radio buttons. FIG. 15B is a diagram illustrating a screen 1050 including radio buttons. The information processing apparatus 10 searches for character strings in the vicinity of an entry field of the radio button and temporarily sets character strings near the entry field as candidates for a title. Further, the information processing apparatus 10 acquires, for example, a list of options by analyzing the radio button of the entry field. Thus, the information processing apparatus 10 can create a component from the screen 1040 and the screen 1050 each including the radio buttons.

FIG. 16A, FIG. 16B, and FIG. 16C are diagrams for describing examples of variations of the creation of a component. FIG. 16A to FIG. 16C illustrates examples in which a validation check logic for the entry field is inherited. FIG. 16A illustrates an example of a screen 1060 that includes an entry field in which an email address is to be entered. FIG. 16B illustrates an example of a screen 1070 that includes an entry field in which a last name (Roman alphabet) is to be entered and an entry field in which a first name (Roman alphabet) is to be entered. FIG. 16C illustrates an example of a screen 1080 that includes an entry field in which an age is to be entered.

When an input operation by the user such as the administrator is a one byte alphanumeric email address, the information processing apparatus 10 can cause the entry field for the last name (Roman alphabet), the entry field for the first name (Roman alphabet), and the entry field for the age to inherit the validation check logic of the one byte alphanumeric characters.

FIG. 17A and FIG. 17B are diagrams for describing examples of variations of the creation of a component. FIG. 17A is a diagram illustrating an example of a screen 1090 including a list box. FIG. 17B is a diagram illustrating a screen 1100 including a list box. The information processing apparatus 10 searches for character strings in the vicinity of an entry field of the list box and temporarily sets character strings near the entry field as candidates for a title. Further, the information processing apparatus 10 acquires, for example, a list of options by analyzing the list box of the entry field. Thus, the information processing apparatus 10 can create a component from the screen 1090 and the screen 1100 each including the list box.

In the following, examples of other operations performed with respect to a screen by the user such as the administrator are described. FIG. 18 is a diagram for describing other examples of operations with respect to a screen by the user such as the administrator and operations to be recorded with the recording function.

FIG. 18 is an illustration of an example of a screen that receives an operation from the user such as the administrator. A screen 1200 represents a display example for performing registration of "About card service and payment" without an application for a family card. For example, a series of operations with respect to the screen 1200 of FIG. 18 by the user such as the administrator is recorded by starting and ending recording with the recording function as illustrated in FIG. 19.

Figure 19:
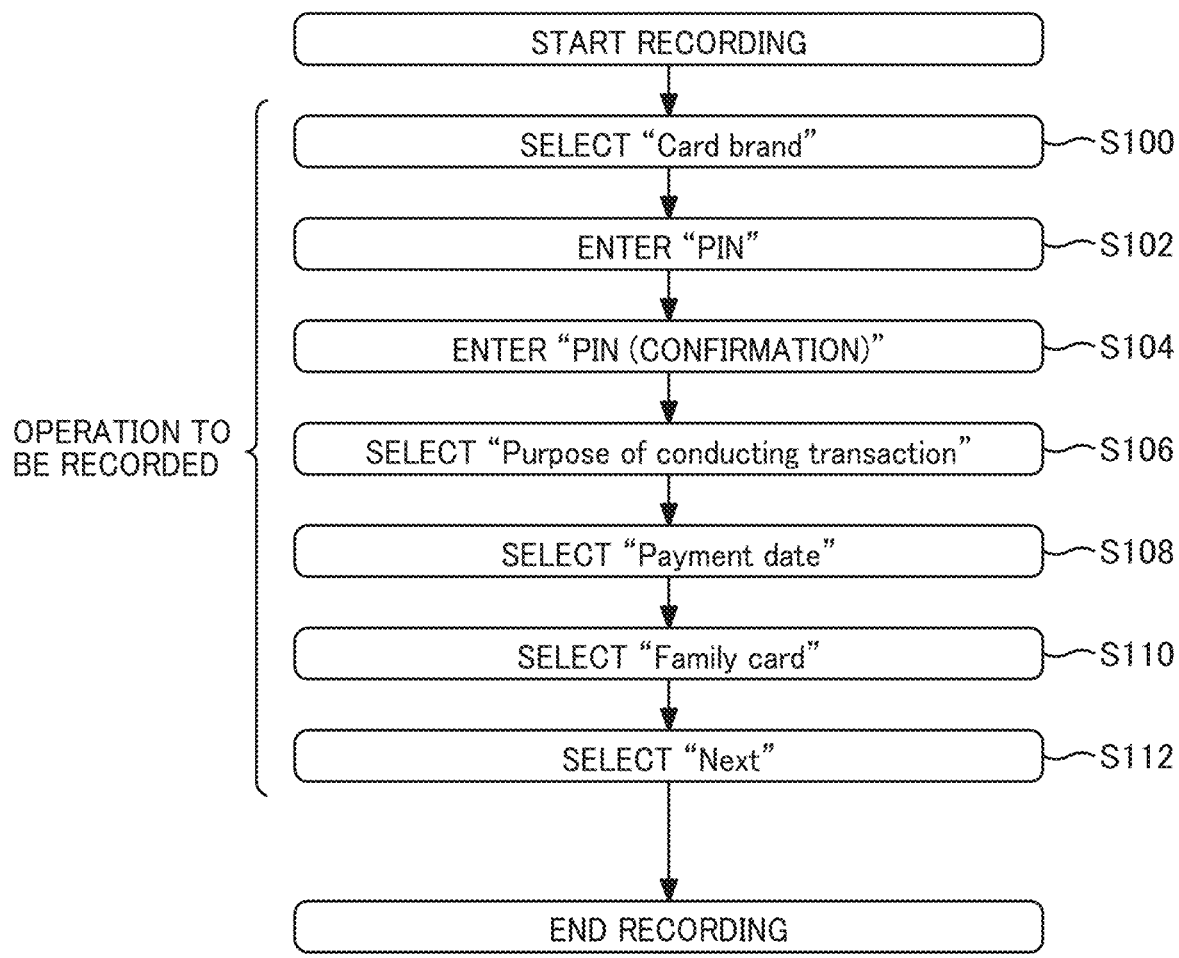
FIG. 19 is a flowchart illustrating an operation performed when a recording function is used, according to an embodiment of the present disclosure.

FIG. 19 is a flowchart illustrating an operation performed when the recording function is used. In step S100, the operation receiving unit 34 of the information processing apparatus 10 receives an operation of selecting a "card brand" on the screen 1200 by the user such as the administrator. In step S102, the operation receiving unit 34 receives an operation of inputting a "PIN" on the screen 1200 by the user such as the administrator. In step S104, the operation receiving unit 34 receives an operation of entering a "PIN (confirmation)" on the screen 1200 by the user such as the administrator. In step S106, the operation receiving unit 34 receives an operation of selecting a "Purpose of conducting transaction" on the screen 1200 by the user such as the administrator. In step S108, the operation receiving unit 34 receives an operation of selecting a "Payment date" on the screen 1200 by the user such as the administrator. In step S110, the operation receiving unit 34 receives an operation of selecting "agree and apply" or "do not apply" for "Family card" on the screen 1200 by the user such as the administrator. FIG. 19 illustrates an example in which the user performs operation of selecting not to apply for a family card. In step S112, the operation receiving unit 34 receives an operation of selecting the "Next" button on the screen 1200 by the user such as the administrator.

Figure 20:
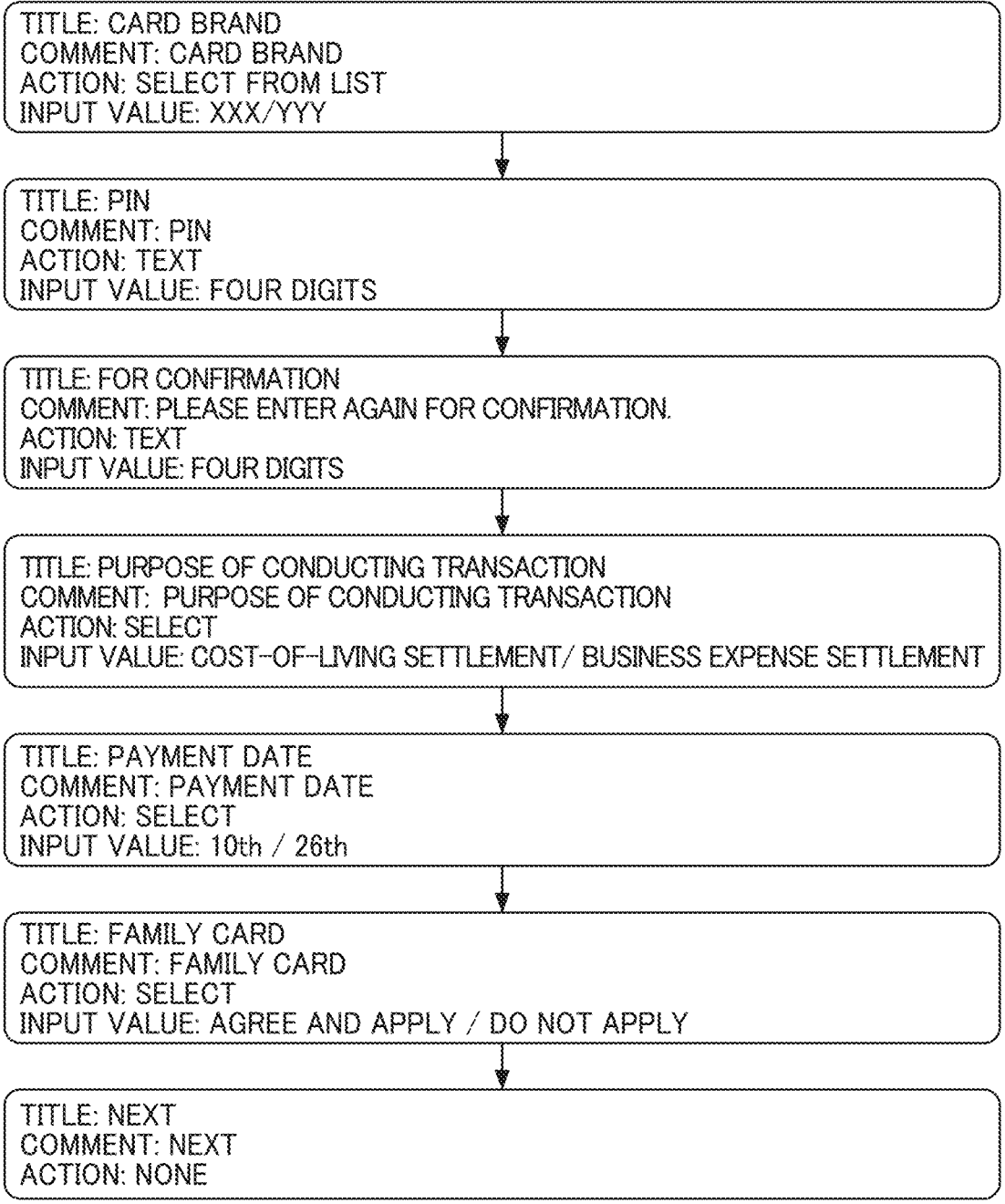
FIG. 20 is a diagram illustrating examples of components automatically generated based on operations recorded with a recording function, according to an embodiment of the present disclosure.

The information processing apparatus 10 automatically generates components as illustrated in FIG. 20 respectively based on the operations described with reference to FIG. 19 recorded by using the recording function. FIG. 20 is a diagram illustrating examples of components automatically generated based on the operations recorded with the recording function.

The information processing apparatus 10 generates a component including, as information, "title: card brand", "comment: card brand", "action: select from list", and "input value: XXX/YYY", based on a record of an operation indicating that the user such as the administrator selects a desired card brand from an entry field of "card brand" on the screen 1200 of FIG. 18.

Further, the information processing apparatus 10 generates a component including, as information, "title: PIN", "comment: PIN", "action: text", and "input value: four digits", based on a record of an operation indicating that the user such as the administrator enters a PIN in an entry field of "PIN" on the screen 1200 of FIG. 18. The information processing apparatus further generates other components as illustrated in FIG. 20 in substantially the same manner.

FIG. 21 is an illustration of an example of a screen that receives an operation from the user such as the administrator. The screen 1200 of FIG. 21 represents a display example for performing registration of "About card service and payment" with an application for a family card. For example, a series of operations with respect to the screen 1200 of FIG. 21 by the user such as the administrator is recorded by starting and ending recording with the recording function as illustrated in FIG. 22.

Figure 22:
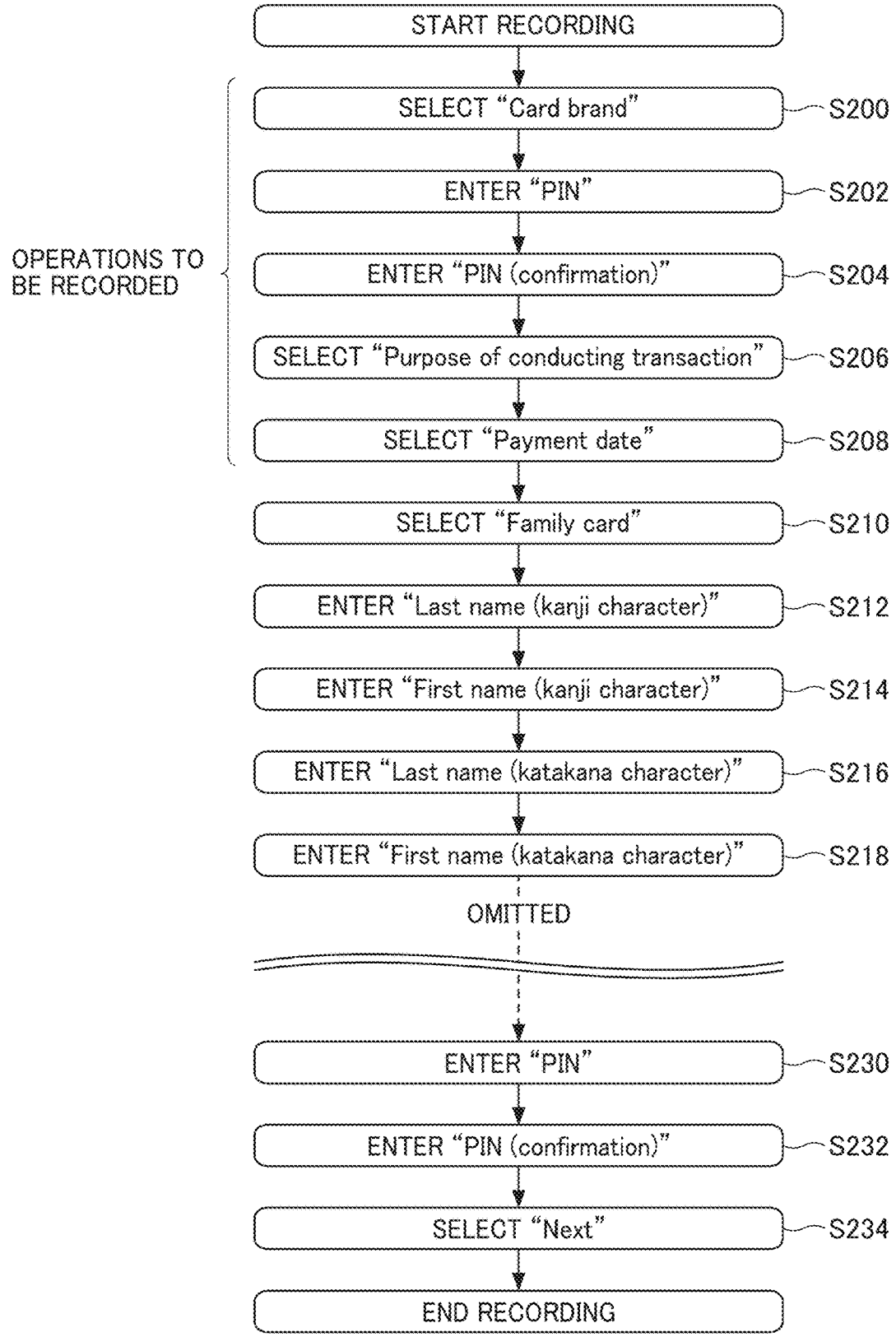
FIG. 22 is a flowchart illustrating an operation performed when a recording function is used, according to an embodiment of the present disclosure.

FIG. 22 is a flowchart illustrating an operation performed when the recording function is used. Processes of steps S200 to S208 are performed in the same or substantially the same manner as described above with reference to steps S100 to S108 in FIG. 19. In step S210, the operation receiving unit 34 of the information processing apparatus 10 receives an operation of selecting "agree and apply" or "do not apply" for "Family card" on the screen 1200 by the user such as the administrator. FIG. 22 illustrates an example in which the user performs operation of selecting to apply for a family card. In steps S212 to S232, the operation receiving unit 34 receives an operation of applying for the family card on the screen 1200 of FIG. 21 by the user such as the administrator. In step S234, the operation receiving unit 34 receives an operation of selecting the "Next" button on the screen 1200 by the user such as the administrator.

The information processing apparatus 10 automatically generates components as illustrated in FIG. 23 respectively based on the operations described with reference to FIG. 22 recorded by using the recording function. FIG. 23 is a diagram illustrating examples of components automatically generated based on the operations recorded with the recording function.

The information processing apparatus 10 generates a component including, as information, "title: card brand", "comment: card brand", "action: select from list", and "input value: XXX/YYY", based on a record of an operation indicating that the user such as the administrator selects a desired card brand from an entry field of "card brand" on the screen 1200 of FIG. 21.

Further, the information processing apparatus 10 generates a component including, as information, "title: PIN", "comment: PIN", "action: text", and "input value: four digits", based on a record of an operation indicating that the user such as the administrator enters a PIN in an entry field of "PIN" on the screen 1200 of FIG. 21. The information processing apparatus further generates other components as illustrated in FIG. 23 in substantially the same manner.

Figure 24A:
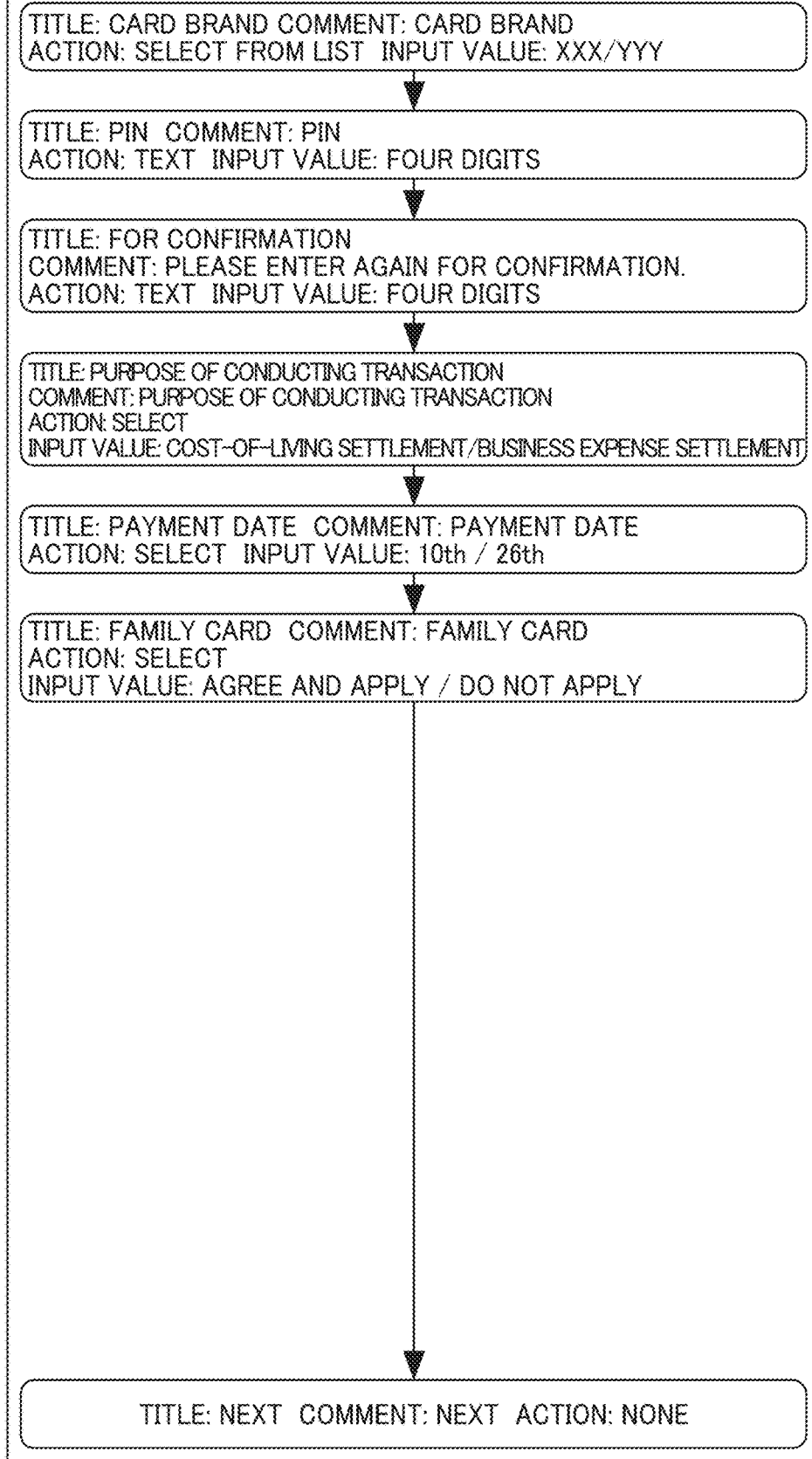
Figure 24C:
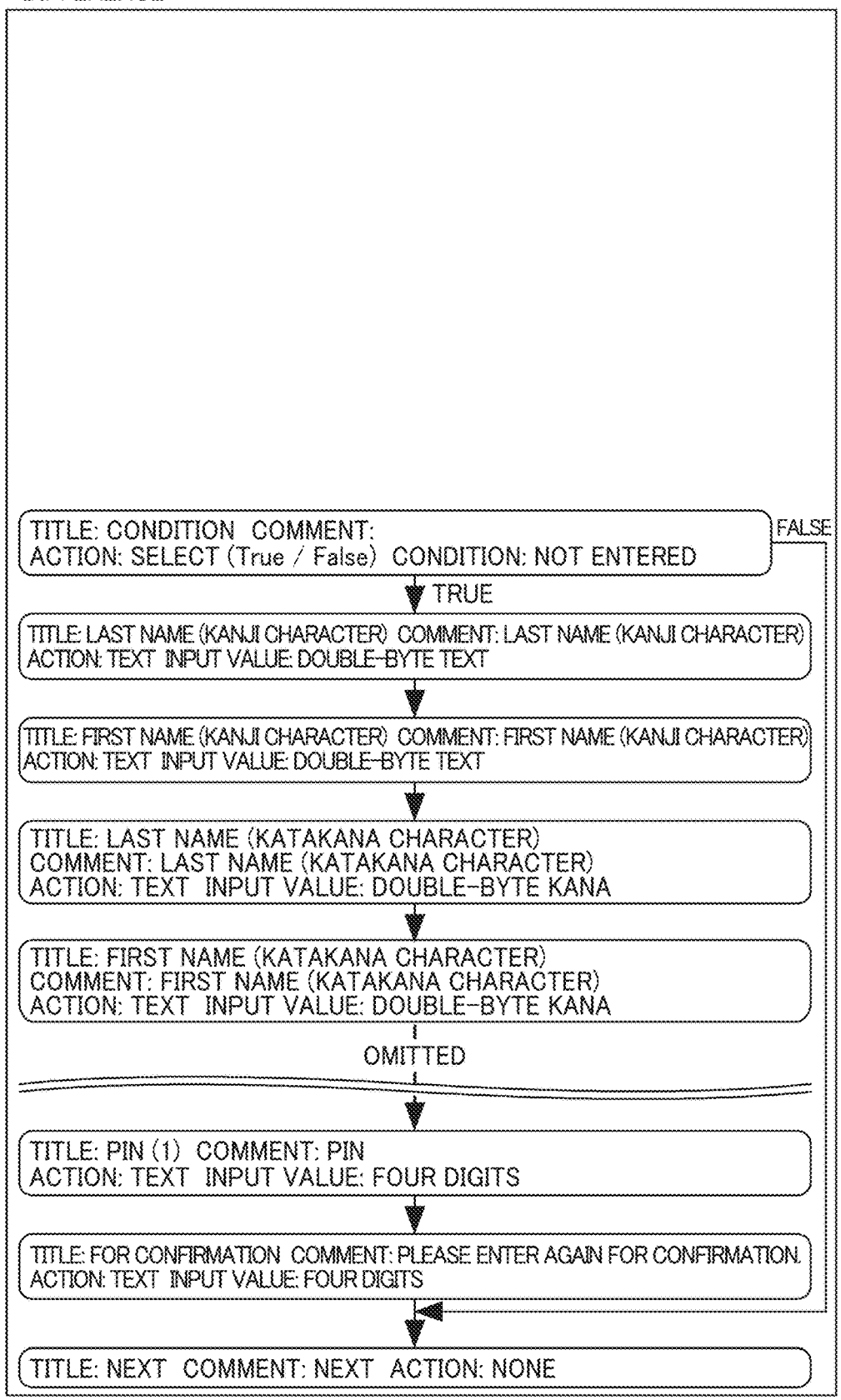

FIG. 24A, FIG. 24B, and FIG. 24C are diagrams for describing an example of processing for generating a conditional branch. FIG. 24A illustrates a flow that is automatically generated according to operations performed by the user such as the administrator with respect to the screen 1200 illustrated in FIG. 18. FIG. 24B illustrates a flow that is automatically generated according to operations performed by the user such as the administrator with respect to the screen 1200 illustrated in FIG. 21.

The difference extraction unit 54 compares the flow of FIG. 24A with the flow of FIG. 24B, both being stored in the flow storage unit 50. The difference extraction unit 54 extracts a difference between the operation components of the flow of FIG. 24A and the operation components of the flow of FIG. 24B, as illustrated in FIG. 24C.

The conditional branch setting unit 56 sets (adds) an operation component of a conditional branch before the component corresponding to the difference, based on the difference between the operation components extracted by the difference extraction unit 54. The operation component of the conditional branch is a component including, as information, "title: condition", "action: selection (True/False)", and "condition: not entered". In other words, whether the user performs registration of "About card service and payment" with an application for a family card or without an application for a family card is one example of a predetermined condition. Further, the conditional branch setting unit 56 sets the branch of the operation component of the conditional branch so as to converge (skip) to the operation component that is after the operation component of the difference and has no difference.

Figure 25:
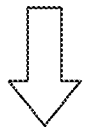
FIG. 25 is a diagram for describing an example of information of components before editing and information of components after editing, according to an embodiment of the present disclosure.

The information processing apparatus 10 according to the present embodiment receives the user's operation of editing the information of the components included in the automatically generated flow, to edit the information of the component of the operation component of the conditional branch, for example, as illustrated in FIG. 25.

FIG. 25 is a diagram for describing an example of the information of the components before the edit and the information of the components after the edit. In FIG. 25, the information of the component before the edit is illustrated on the upper side and the information of the component after the edit is illustrated on the lower side. FIG. 25 illustrates the component of the operation component of the conditional branch among the components included in the automatically generated flow, and the other components are omitted.

For example, in FIG. 25, a component including, as information, "title: condition", "action: selection (True/False)", and "condition: not entered" is edited to a component including "title: condition", "action: selection (True/False)", and "family card=agree and apply" as a condition.

Figure 26:
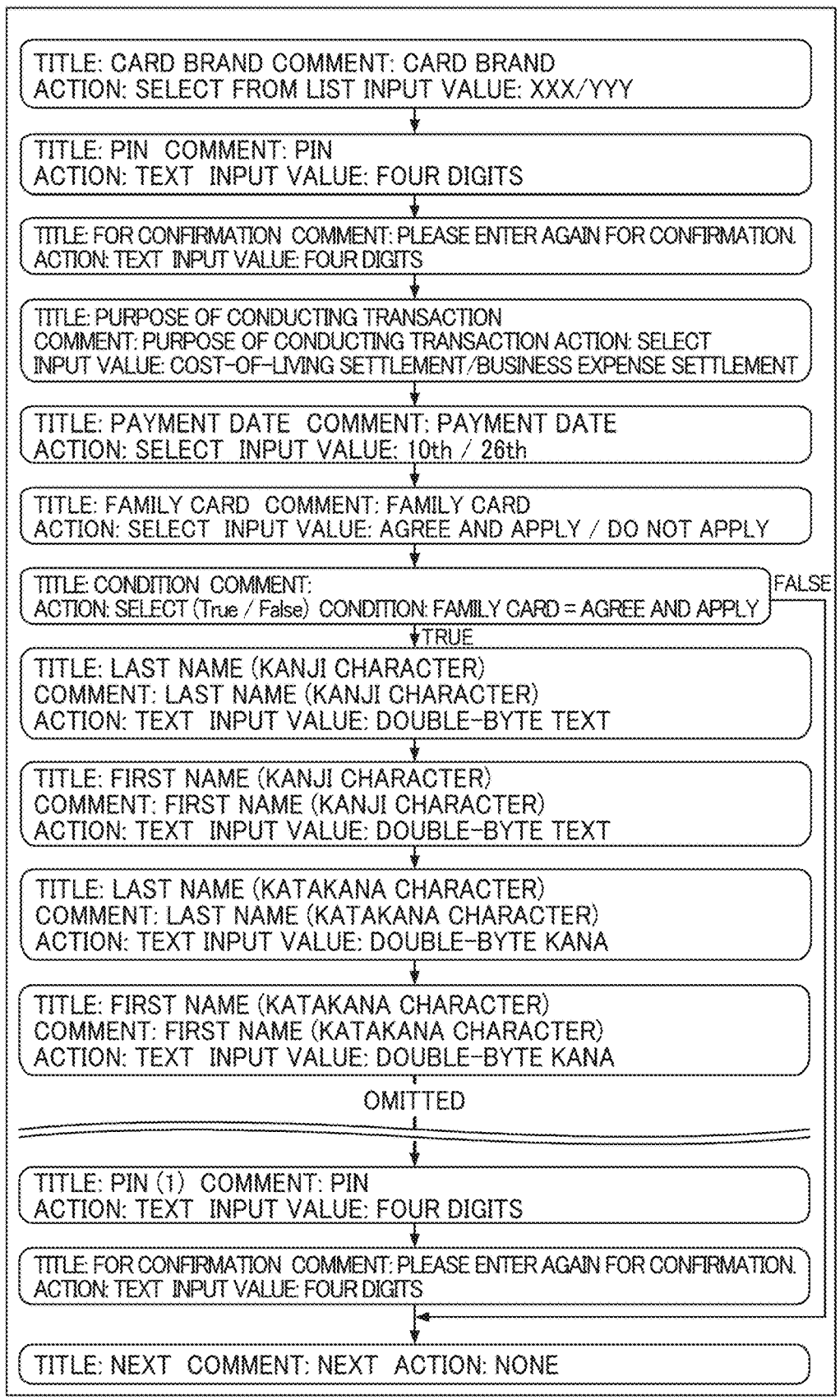
FIG. 26 is a diagram for describing an example of a flow obtained by editing information of a component, according to an embodiment of the present disclosure.

Through the edit of the information of components as described above with reference to FIG. 25 and the edit of the components for displaying a screen in a manner that content on the screen is displayed in a dialogue format, the information processing apparatus 10 modifies the flow before the edit as illustrated in FIG. 20 and FIG. 23 to a flow after the edit as illustrated in FIG. 26. According to the flow after the edit, a determination is performed whether to agree and apply for a family card or not to apply for a family card, and processing is branched based on a result of the determination.

FIG. 26 is a diagram for describing an example of a flow obtained by editing information of a component. For example, the user such as the administrator edits the component information so that a transition destination in a case where a condition of "Family card=agree and apply" is satisfied in the seventh component is the eighth component, as illustrated in FIG. 26. Further, for example, the user such as the administrator edits the component information so that a transition destination in a case where the condition of "Family card=agree and apply" is not satisfied in the seventh component is the component of "Next".

The information processing apparatus 10 automatically generates the flow as illustrated in FIG. 26, for example, according to the order of operations performed with respect to the screen 1200 by the user such as the administrator. Thus, according to the present embodiment, operations performed with respect to the screen 1200 by the user such as the administrator are recorded by using the recording function. With such configuration, the screen of the flow to be processed by the BOT is automatically generated.

Further, the information processing apparatus 10 receives operations of editing the automatically generated components and editing the automatically generated flow by the user such as the administrator, thereby creating an improved screen in a dialogue format. For example, the user operates the screen that is displayed on the information processing apparatus 10 and improved to a dialogue format, thereby causing the flow of FIG. 26 to be executed.

Figure 27:
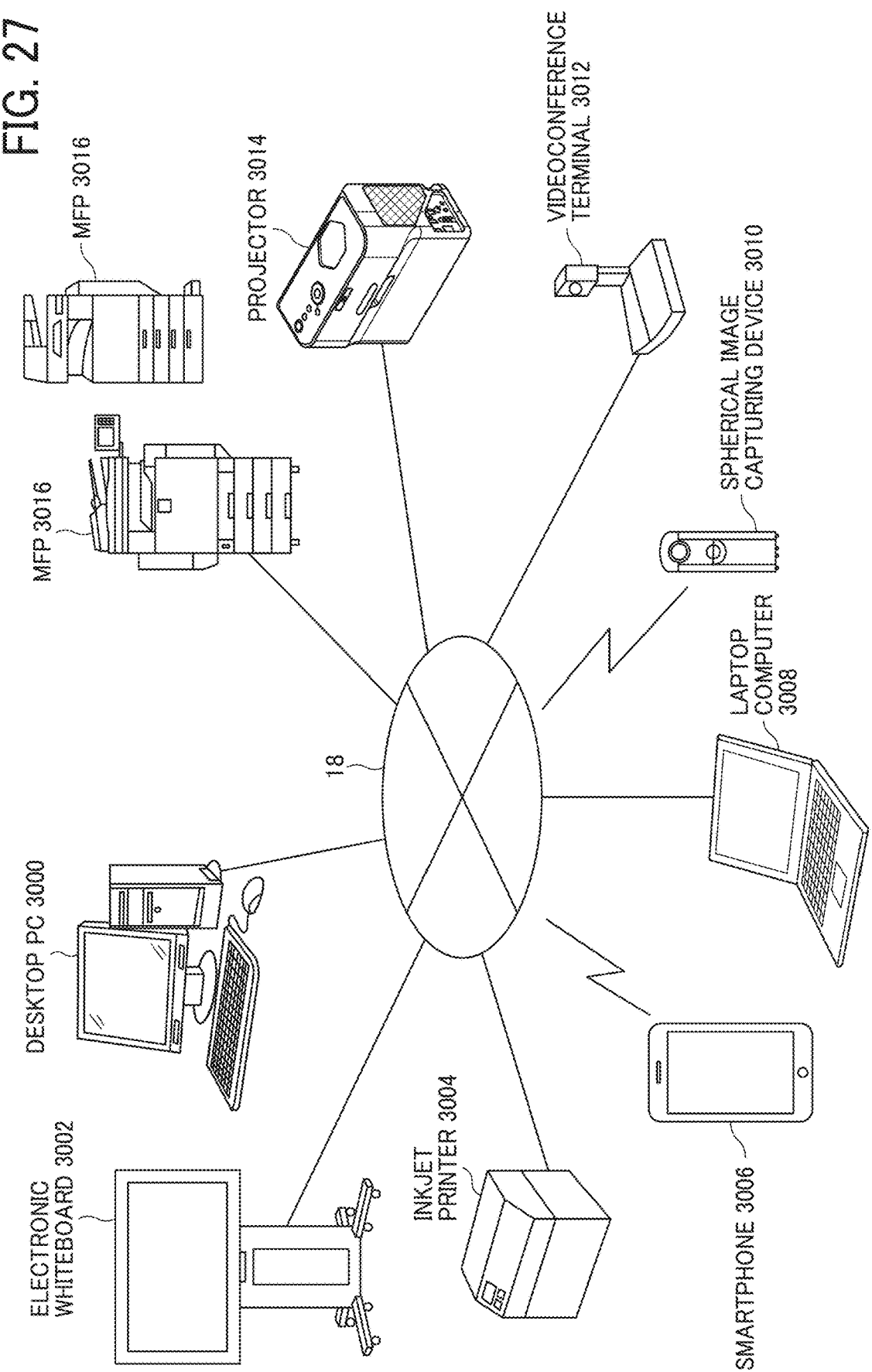
FIG. 27 is a diagram for describing an example of an apparatus that displays a screen of a flow generated according to an embodiment and receives an operation from a user, according to an embodiment of the present disclosure.

The generated flow can be displayed on screens of various devices illustrated in FIG. 27, for example, and the devices receive an operation from the user. FIG. 27 is a diagram for describing an example of an apparatus that displays a screen of a flow generated according to the present embodiment and receives an operation from a user.

As illustrated in FIG. 27, examples of the apparatus that displays a screen of a flow generated as described above according to the present embodiment and receive an operation from a user include a desktop PC 3000, an electronic whiteboard 3002, an inkjet printer 3004, a smartphone 3006, a laptop computer 3008, a spherical image capturing device 3010, a videoconference terminal 3012, a projector 3014, and an image forming apparatus 3016 such as a multifunction peripheral (MFP).

As described above, according to the present embodiment, a flow to be processed by a software robot is generated more efficiently.

A flow of operations to be processed by a computer that executes an application sometimes include a conditional branch. In an information processing apparatus that generates a flow of operations including such a conditional branch, a mechanism is desired that allows a user such as an administrator to more efficiently generate the flow.

According to one or more embodiments of the present disclosure, an operation flow including a conditional branch is more efficiently generated, the operation flow being processed by a computer that executes an application.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The apparatuses or devices described in the above-described embodiment are merely one example of the plural computing environments that implement the embodiments disclosed herein. The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An information processing apparatus, comprising circuitry configured to:
    display one or more screens configured to receive an operation by a user;
    identify an operation item corresponding to the operation based on display information of the one or more screens, according to the operation on the one or more screens;
    generate an operation component associated with a condition corresponding to the operation item;
    generate a flow of operations based on the operation component according to an order of operations including the operation by the user, the flow of operations being a flow to be performed by a computer executing an application;

compare multiple flows including the generated flow of operations with one another, to extract a difference between multiple operation components including the generated operation component included in one of the multiple flows and multiple operation components included in another one of the multiple flows; and add an operation component of a conditional branch before one of the multiple operation components, the one of the multiple operation components being a component for which the difference is extracted, and a branch of the operation component of the conditional branch being configured to skip to an operation component that has no difference among the multiple flows.

2. The information processing apparatus of claim 1, wherein the operation component of the conditional branch that is added by the circuitry branches the flow of operations depending on whether a condition is satisfied.

3. The information processing apparatus of claim 2, wherein the operation component of the conditional branch that is added by the circuitry branches the flow of operations depending on whether the condition is satisfied so that the flow of operations skips from processing corresponding to the operation component of the conditional branch to processing corresponding to another one of the multiple operation components that is after the component for which the difference is extracted and that has no difference extracted.

4. The information processing apparatus of claim 1, wherein the circuitry is further configured to:
display the generated operation component of the flow of operations; and
receive an operation of editing the operation component of the conditional branch by the user.

5. The information processing apparatus of claim 4, wherein the circuitry is further configured to display the operation component of the flow of operations in a dialogue format.

6. The information processing apparatus of claim 1, wherein the flow of operations is configured to allow a software robot to operate the application.

7. A flow generation method performed by an information processing apparatus, the method comprising:
displaying one or more screens configured to receive an operation by a user;
identifying an operation item corresponding to the operation based on display information of the one or more screens, according to the operation on the one or more screens;
generating an operation component associated with a condition corresponding to the operation item;
generating a flow of operations based on the operation component according to an order of operations including the operation by the user, the flow of operations being a flow to be processed by a computer that executes an application;
comparing multiple flows including the generated flow of operations with one another, to extract a difference between multiple operation components including the generated operation component included in one of the multiple flows and multiple operation components included in another one of the multiple flows; and
adding an operation component of a conditional branch before one of the multiple operation components, the one of the multiple operation components being a component for which the difference is extracted, and a branch of the operation component of the conditional branch being configured to skip to an operation component that has no difference among the multiple flows.

8. The flow generation method of claim 7, wherein the added operation component of the conditional branch branches the flow of operations depending on whether a condition is satisfied.

9. The flow generation method of claim 8, wherein the added operation component of the conditional branch branches the flow of operations depending on whether the condition is satisfied so that the flow of operations skips from processing corresponding to the operation component of the conditional branch to processing corresponding to another one of the multiple operation components that is after the component for which the difference is extracted and that has no difference extracted.

10. The flow generation method of claim 7, further comprising:
displaying the generated operation component of the flow of operations; and
receiving an operation of editing the operation component of the conditional branch by the user.

11. The flow generation method of claim 10, wherein the adding includes displaying the operation component of the flow of operations in a dialogue format.

12. The flow generation method of claim 7, wherein the flow of operations is configured to allow a software robot to operate the application.

13. A non-transitory recording medium storing a plurality of instructions, which, when executed by an information processing apparatus, cause the information processing apparatus to carry out a flow generation method comprising:
displaying one or more screens configured to receive an operation by a user;
identifying an operation item corresponding to the operation based on display information of the one or more screens, according to the operation on the one or more screens;
generating an operation component associated with a condition corresponding to the operation item;
generating a flow of operations based on the operation component according to an order of operations including the operation by the user, the flow of operations being a flow to be processed by a computer that executes an application;
comparing multiple flows including the generated flow of operations with one another, to extract a difference between multiple operation components including the generated operation component included in one of the multiple flows and multiple operation components included in another one of the multiple flows; and
adding an operation component of a conditional branch before one of the multiple operation components, the one of the multiple operation components being a component for which the difference is extracted, and a branch of the operation component of the conditional branch being configured to skip to an operation component that has no difference among the multiple flows.

14. The non-transitory recording medium of claim 13, wherein the added operation component of the conditional branch branches the flow of operations depending on whether a condition is satisfied.

15. The non-transitory recording medium of claim 14, wherein the added operation component of the conditional branch branches the flow of operations depending on whether the condition is satisfied so that the flow of operations skips from processing corresponding to the operation component of the conditional branch to processing corresponding to another one of the multiple operation components that is after the component for which the difference is extracted and that has no difference extracted.

16. The non-transitory recording medium of claim 13, the flow generation method further comprising:
  displaying the generated operation component of the flow of operations; and
  receiving an operation of editing the operation component of the conditional branch by the user.

17. The non-transitory recording medium of claim 16, wherein the adding includes displaying the operation component of the flow of operations in a dialogue format.

18. The non-transitory recording medium of claim 13, wherein the flow of operations is configured to allow a software robot to operate the application.

* * * * *